US006793752B2

(12) United States Patent
Lemaire et al.

(10) Patent No.: US 6,793,752 B2
(45) Date of Patent: Sep. 21, 2004

(54) PRECISION LONGITUDINAL REGISTRATION OF TIRE BUILDING DRUM TO AUTOMATED TIRE BUILDING SYSTEM WORK STATION

(75) Inventors: Michel Lemaire, Habay-la-Neuve (BE); John Kolbjoern Rodseth, Bissen (LU); Francis Cornet, Habay-la-Vieille (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 233 days.

(21) Appl. No.: 09/957,731

(22) Filed: Sep. 21, 2001

(65) Prior Publication Data

US 2003/0056881 A1 Mar. 27, 2003

(51) Int. Cl.⁷ .......................... B29D 30/00; B29D 30/26
(52) U.S. Cl. ...................................... 156/111; 156/396
(58) Field of Search ................................ 156/111, 396; 29/407.29, 407.1, 429, 430; 414/322.04, 222.05, 222.06, 584, 747.6; 198/345.3, 345.2, 345.1, 341.03, 341.05, 341.02, 617

(56) References Cited

U.S. PATENT DOCUMENTS

| | | | |
|---|---|---|---|
| 1,309,894 A | 7/1919 | Kilborn | |
| 2,319,643 A | 5/1943 | Sterand et al. | |

(List continued on next page.)

FOREIGN PATENT DOCUMENTS

| | | |
|---|---|---|
| DE | 609645 | 2/1935 |
| EP | 0105048 | 4/1984 |
| EP | 1295699 | 3/2003 |
| EP | 1295701 | 3/2003 |
| EP | 1295708 | 3/2003 |

OTHER PUBLICATIONS

U.S. patent application Ser. No. 09/957,785, Zeh et al., filed Sep. 21, 2001.
U.S. patent application Ser. No. 09/960,078, LeMaire et al., filed Sep. 21, 2001.
U.S. patent application Ser. No. 09/957,740, Durand et al., filed Sep. 21, 2001.

Primary Examiner—Geoffrey L. Knable
(74) Attorney, Agent, or Firm—Howard M. Cohn

(57) ABSTRACT

Method and apparatus for precision longitudinal registration of a movable tire building drum (120, 620) to an automated tire building system (100) work station (110, 610), wherein the automated tire building system comprises one or more work stations with application drums (112), and the tire building drum is moved longitudinally forward (105) into and out of each work station, comprising: providing a work station longitudinal reference point (115, 615) upon a forward-facing surface (115, 615) of a laterally extendible portion (114, 614) of the work station; providing a drum reference point (125, 625) upon a rearward-facing surface (125, 625) of the tire building drum; and after the tire building drum has been moved into a work station, halting the tire building drum movement, laterally extending the work station longitudinal reference point rearward of the tire building drum, and then moving the tire building drum longitudinally rearward to abut the drum reference point against the work station longitudinal reference point. The tire building drum can be moved by a self-propelled vehicle (102, 602) which is flexibly connected to the tire building drum with a coupling (560, 660) which can be uncoupled. Then the tire building drum is moved longitudinally rearward by: coupling the work station to the tire building drum; uncoupling the tire building drum from the vehicle; and longitudinally moving the tire building drum relative to the vehicle. The flexible connecting means allows controlled lateral and vertical movement of the tire building drum relative to the vehicle while the vehicle is moving the tire building drum forward.

4 Claims, 12 Drawing Sheets

U.S. PATENT DOCUMENTS

| | | |
|---|---|---|
| 3,157,542 A | 11/1964 | Trevaskis |
| 3,591,439 A | 7/1971 | Leblond et al. |
| 3,656,289 A * | 4/1972 | Merck .......... 57/261 |
| 3,850,730 A | 11/1974 | Brey et al. |
| 4,314,864 A | 2/1982 | Loeffler et al. |
| 4,359,675 A | 11/1982 | Miller |
| 4,366,753 A | 1/1983 | Glanz et al. |
| 4,443,290 A * | 4/1984 | Loeffler et al. ......... 156/396 |
| 4,629,385 A | 12/1986 | Irie |
| 4,711,691 A | 12/1987 | Menell et al. |
| 4,776,080 A | 10/1988 | Christensen |
| 5,215,611 A | 6/1993 | Sergel et al. |
| 5,222,293 A | 6/1993 | Ozimek et al. |
| 5,980,087 A | 11/1999 | Brandon et al. |
| 6,032,565 A | 3/2000 | Okonski et al. |
| 6,092,002 A | 7/2000 | Kastman et al. |

* cited by examiner

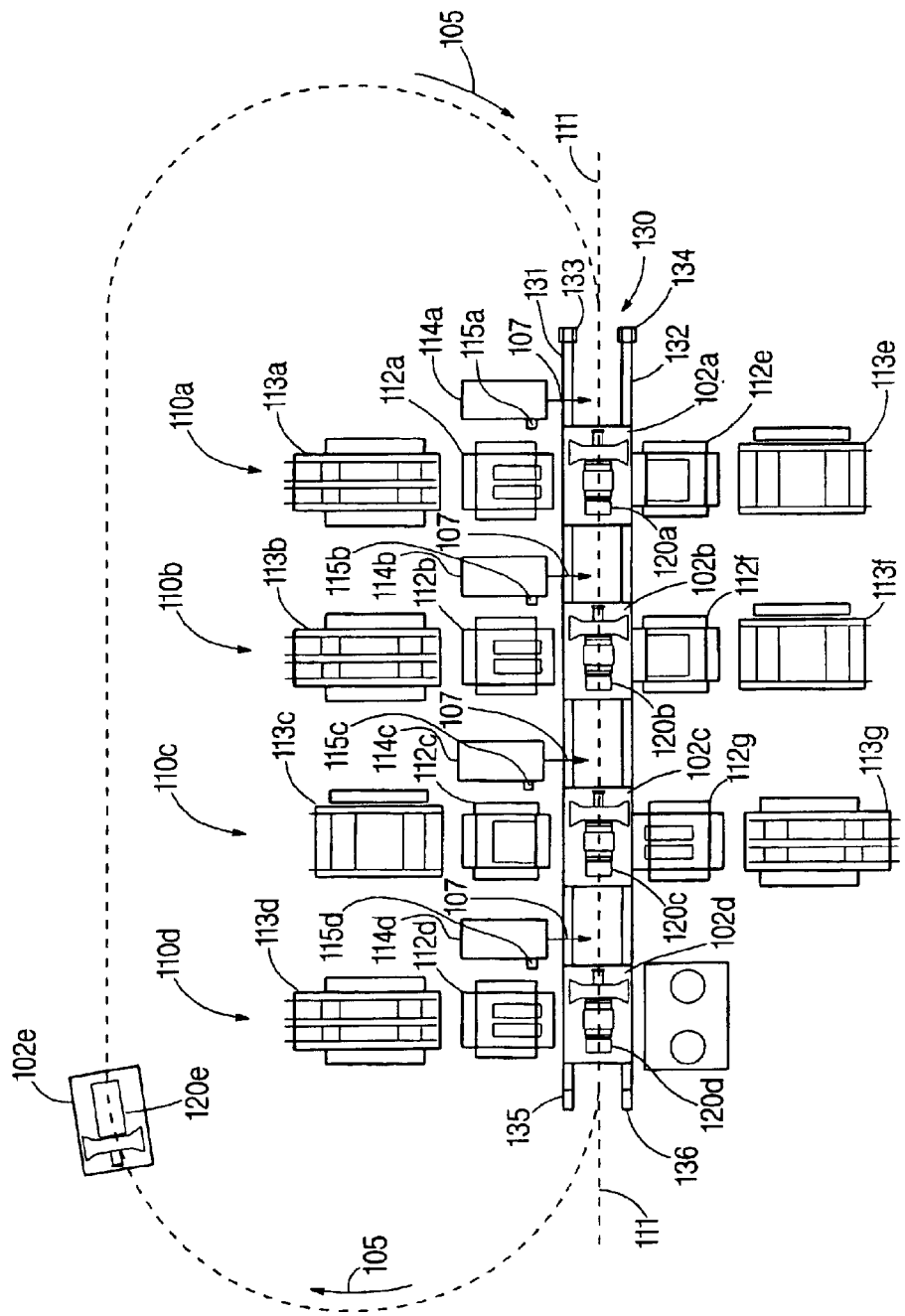

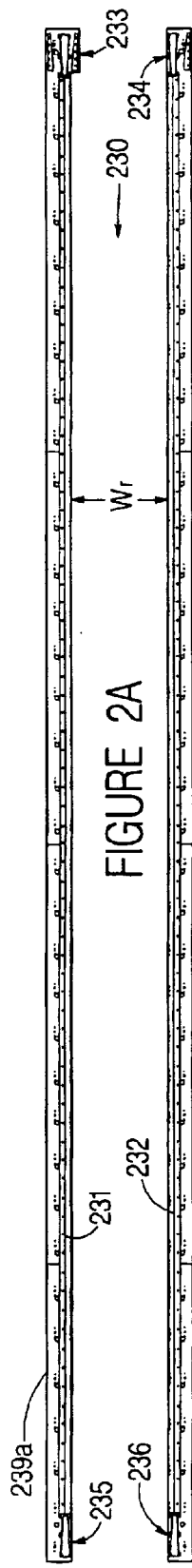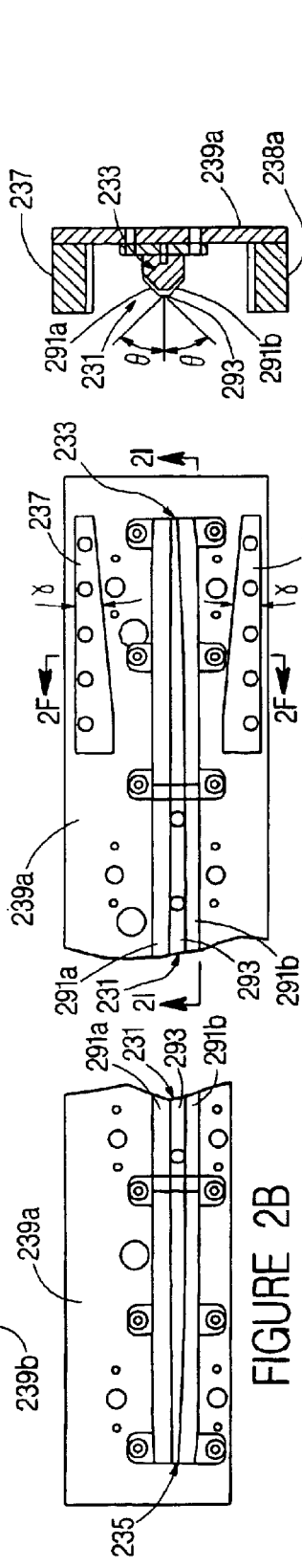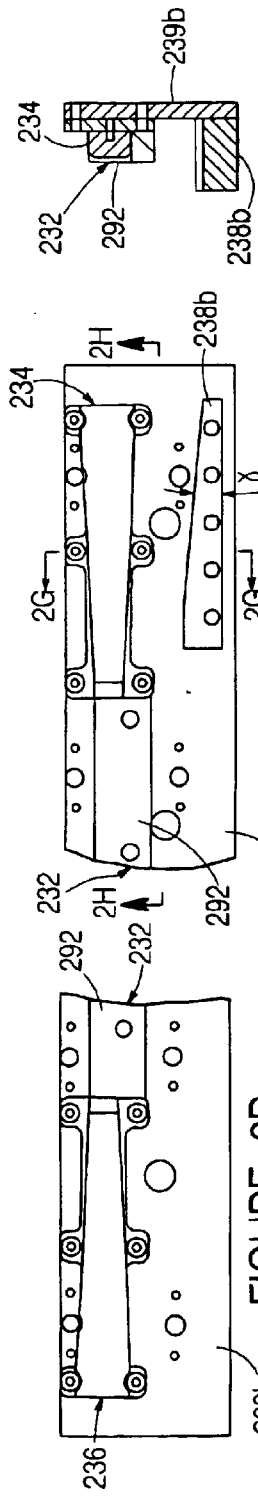

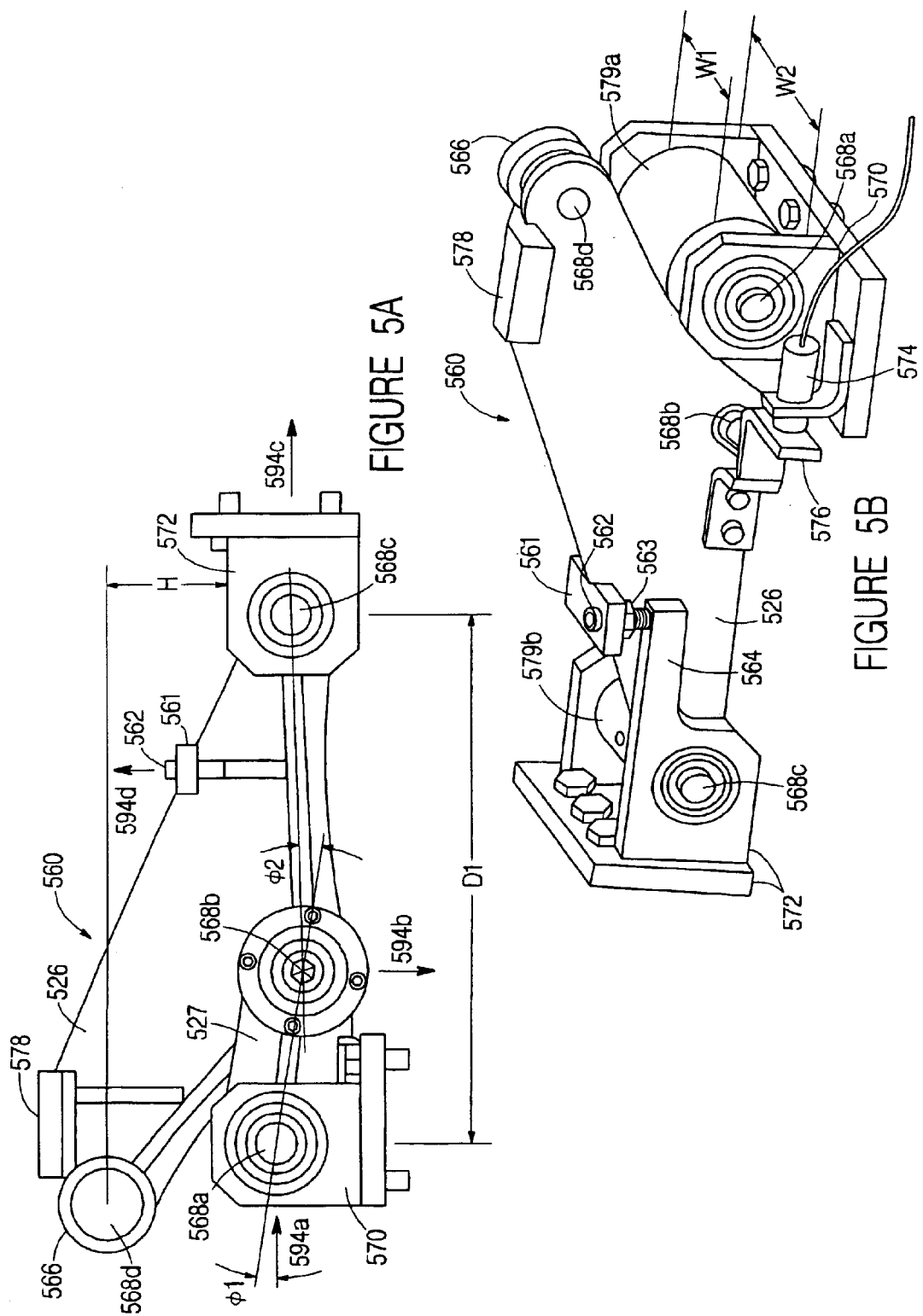

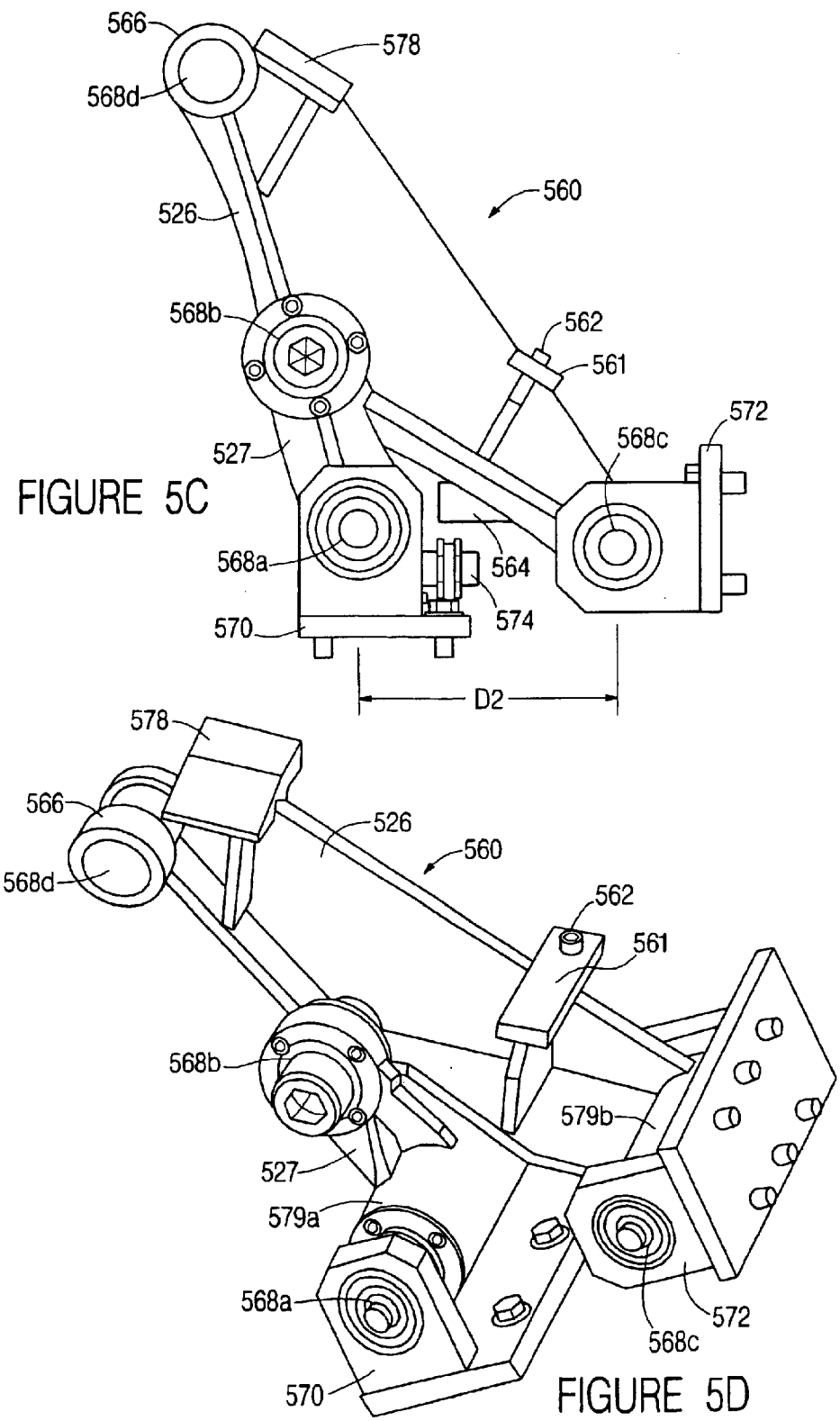

PRECISION LONGITUDINAL REGISTRATION OF TIRE BUILDING DRUM TO AUTOMATED TIRE BUILDING SYSTEM WORK STATION

CROSS-REFERENCE TO RELATED APPLICATIONS

This application relates to U.S. Patent application Ser. No. 09/957,785 entitled METHOD FOR MANUFACTURING TIRES ON A FLEXIBLE MANUFACTURING SYSTEM, and filed on an even date herewith.

This application relates to U.S. Patent application Ser. No. 09/960,078 entitled PRECISION ALIGNMENT OF TIRE BUILDING DRUM TO AUTOMATED TIRE BUILDING SYSTEM WORKING AXIS, and filed on an even date herewith.

This application relates to U.S. Patent application Ser. No. 09/957,740 entitled BEAD LOADING METHOD AND APPARATUS, and filed on an even date herewith.

TECHNICAL FIELD OF THE INVENTION

The present invention relates to automated tire building machines and, more particularly, to methods and apparatus for precisely registering the longitudinal position of a movable tire building drum to the work stations of an automated tire building system.

BACKGROUND OF THE INVENTION

It is well known that the components of most pneumatic tire constructions must be assembled in a way which promotes good tire uniformity in order to provide proper tire performance. For example, a tread which "snakes" as it goes around the tire circumference will cause wobbling as the tire is operated. For example, a carcass ply which is lopsided (longer cords on one side of the tire than the other side) can cause a variety of tire nonuniformity problems including static imbalance and radial force variations. For example, a tire which is not meridionally symmetric (e.g., tread not centered between beads) can cause a variety of tire nonuniformity problems including couple imbalance, lateral force variations, and conicity. Therefore, in order to meet typical tire performance requirements, the tire industry generally expends considerable effort in producing tires with good uniformity. Tire uniformity is generally considered to mean tire dimensions and mass distributions which are uniform and symmetric radially, laterally, circumferentially, and meridionally, thereby producing acceptable results for measurements of tire uniformity including static and dynamic balance, and also including radial force variation, lateral force variation, and tangential force variation as measured on tire uniformity machines which run the tire under load on a road wheel.

Although certain degrees of tire nonuniformity can be corrected in post-assembly manufacturing (e.g., by grinding), and/or in use (e.g., applying balance weights to the rim of a tire/wheel assembly), it is preferable (and generally more efficient) to build-in tire uniformity as much as possible. Typical tire building machines comprise a tire building drum around which the tire components are wrapped in successive layers including, for example, an innerliner, one or more carcass plies, optional sidewall stiffeners and bead area inserts (e.g., apex), sidewalls, and bead wire rings (beads). After this layering, the carcass ply ends are wrapped around the beads, the tires are blown up into a toroidal shape, and the tread/belt package is applied.

Typically the tire building drum is in a fixed location on the plant floor, and the various layers of components are applied manually or automatically using tooling registered to reference points on the fixed drum in order to ensure component placement with the desired degree of precision. The tooling is generally fixed relative to the tire building drum, for example a guide wheel on an arm extending from the same frame (machine base) which supports the tire building drum.

The present invention addresses the unique problems of alignment and registration which arise when the tire building drum is no longer fixed, but instead is a work-piece in a flexible manufacturing system (FMS) wherein the building drum is moved between automated work stations for application of successive component layers in successive work stations. The context of the present invention is an FMS having work-pieces (tire building drums) which are too large to allow the use of a precision pallet conveyor, so the tire building drums are moved (propelled) by other means which are not necessarily able, by themselves, to achieve sufficient accuracy in positioning the tire building drums relative to the work stations. The work stations each have a centerline, or "working axis" of the work station tire assembly devices (tools). Thus, one problem to be addressed is to precisely align the axis of the tire building drum with the working axis in each work station. Such alignment includes assuring that each point along the entire drum length of the tire building drum axis of revolution is within a specified precision distance of the work station working axis, i.e., alignment comprises making the tire building drum axis of revolution coincident with the work station working axis. A second problem, related to the first, is to precisely register the longitudinal position of the tire building drum relative to each work station. A solution to both problems provides three dimensional positioning of the tire building drum relative to the tools and devices of each work station with the desired degree of precision.

U.S. Pat. No. 4,314,864 (Loeffler, et al; 1982) discloses a method and apparatus for building a tire wherein a tire assembly drum (11) is mounted by means of a drum support (15) on a longitudinally movable carriage (12) which moves on a guideway (20) past a plurality of operation stations (A–G) spaced longitudinally along the guideway. Under control of an operator, the carriage/drum is moved to each station in succession, first to last, for successive tire assembly operations. Mechanical datum (30), fixedly located at each operation station, are provided to engage mechanical locators (31) secured to the carriage, and a bladder (42) is provided selectively to cause engagement of the locators with the mechanical datum at each successive station to locate the tire assembly drum precisely with respect to the operation station. After operations at the last operation station, the carriage is returned to the first operation station. The carriage is attached to an operator's platform (16) with which it moves longitudinally, propelled by a drive system (22) which moves the operator's platform. The carriage is individually supported on wheels (19) that ride along individual tracks, or rails (20) that form the guideway. Similarly, wheels (21) are provided under the operator's platform which roll along the ground powered by the drive system. An operator is normally positioned on the operator's platform with ready access to power and sequencing panels and controls. The carriage wheels and rails appear similar in construction to railroad rails and flanged wheels. The platform is controlled to stop the carriage at the various operation stations and does so with relative accuracy. Precise positioning is obtained by use of mechanical locators on the carriage which, upon lowering of the carriage by means of the bladder, interfit with a mechanical datum fixed at each operation station. The mechanical datum comprises preferably at least three frustroconical dogs (30) anchored in the floor. The mechanical locators comprise orienting plates 31 secured to the frame of the carriage, each having an aperture (33) the periphery of which is conically tapered to mate with one of the frustroconical dogs. In order to permit the carriage to move independent of the platform as it comes to rest in positive alignment upon the dogs, a tapered pin (45) and bracket (53) are used to attach the carriage to the platform. The tapered pin is mounted vertically on the carriage and has a long shank of reduced diameter. The bracket is mounted on the operator's platform and has a vertical tapered bore which matingly engages a conical portion of the tapered pin such that when the carriage is lowered onto the dogs, the tapered pin lowers, moving the reduced diameter shank into the bore of the bracket, thereby allowing relative movement between the pin and bracket, and therefore between the carriage and platform. A limitation of the disclosed tire building apparatus/method is that there is only one tire assembly drum being used to assemble only one tire at a time in all the operation stations, using them in sequence and then reversing direction to return to the first station to begin the next tire. Also, precision location involves sliding of surfaces between the dogs and orienting plates, thereby inducing wear and subsequent loss of precision necessitating part replacement for maintenance.

U.S. Pat. No. 1,309,894 (Kilborn; 1919; assigned to Goodyear), discloses an early form of tire assembly automation wherein a number of carcass-mounting units (5, FIG. 1) are arranged in a linear "aligned" series, and a treading/stitching machine (12) rides on a trackway (7) for intermittent correlation with each of the carcass-supporting units of the series. Referring to FIG. 4, the trackway is seen to comprise a pair of flat-topped rails (23, 24) upon which ride wheels (22, 18) which have flanges (28, 26) to hold the wheels on the rails similar to conventional railroad rails and wheels. There are two front wheels (22) and two rear wheels (18). The treading/stitching machine can be rolled off the rails to ride on the floor by means of an extra flange (28) on the front wheels sized to allow the machine to roll about on the wheel flanges. The machine is "readily pushed into a centered position before any of the tires, its weight serving to maintain it stationary during the stitching of any of the tire treads . . ." upon the trackway by a human operator, who uses a pointer (58, FIG. 3) to center the machine relative to a tire carcass: "The operator has but to mark the center of a tire carcass and arrange the machine with the pointer (58) in alignment with the mark on the tire."

The present invention is intended to overcome the limitations of the prior art by providing method and apparatus for precision positioning in three dimensions of tire building drums moving through automated tire building systems.

BRIEF SUMMARY OF THE INVENTION

According to the invention, a method for positioning each of three or more movable tire building drums at each of three or more work stations of an automated tire building system as the tire building drums move longitudinally forward along a working axis extending through the three or more work stations, comprises the steps of: providing a work station longitudinal reference point at each of the three or more work stations; providing a drum reference point upon each of the three or more movable tire building drums; moving each of the tire building drums longitudinally forward into one of the three or more work stations; stopping each of the tire building drums within its respective work station after the drum reference point moves longitudinally forward past the work station longitudinal reference point; and moving each tire building drum longitudinally rearward until the drum reference point abuts against the work station longitudinal reference point to precisely position each of the tire building drums longitudinally within its respective work station.

According to the invention, the method further comprises the steps of: providing the work station longitudinal reference point of each of the three or more work stations upon a surface of an intake server located at each of the three or more work stations for operating the tire building drums; and providing the drum reference point of each of the three or more movable tire building drums upon a surface of each of the three or more movable tire building drums. Even further, the method comprises the step of: moving the three or more intake servers at each of the work stations from a normally retracted position outward across the working axis into a position to couple the intake servers to the tire building drums located at the work stations; and using the intake servers for moving the tire building drums longitudinally rearward until the drum reference point abuts against the work station longitudinal reference point.

According to the invention, the method further comprises the steps of: independently moving each tire building drum with a self-propelled vehicle; and flexibly connecting each tire building drum to one of the vehicles with a coupling which can be uncoupled. Preferably each tire building drum is moved longitudinally rearward by the steps of: coupling the work station to the tire building drum; uncoupling the tire building drum from the vehicle; and longitudinally moving the tire building drum relative to the vehicle. Preferably, the rearward moving means is used to hold the drum reference point against the work station longitudinal reference point. Preferably, the tire building drums are coupled to vehicles with a flexible connecting means which allows controlled lateral and vertical movement of the tire building drum relative to the vehicle while the vehicle is moving the tire building drum.

According to the invention, apparatus for positioning each of three or more movable tire building drums at each of three or more work stations of an automated tire building system as the tire building drums move longitudinally forward along a working axis extending through the three or more work stations, comprises: a work station longitudinal reference point at each of the three or more work stations; a drum reference point upon each of the three or more movable tire building drums; means for moving each of the tire building drums longitudinally forward into one of the three or more work stations; means for stopping each of the tire building drums within its respective work station after the drum reference point moves longitudinally forward past the work station longitudinal reference point; and means for moving each tire building drum longitudinally rearward until the drum reference point abuts against the work station longitudinal reference point to precisely position each of the tire building drums longitudinally within its respective work station.

According to the invention, the apparatus further comprises: an intake server means located at each of the three or more work stations for operating the tire building drums; a surface of the intake server means having thereupon the work station longitudinal reference point of each of the three or more work stations; and a surface of each of the three or more movable tire building drums having thereupon the drum reference point of each of the three or more movable tire building drums. Furthermore, the apparatus comprises:

means for moving the three or more intake server means at each of the work stations from a normally retracted position outward across the working axis into a position to couple the intake server means to the tire building drums located at the work stations; and means for using the intake server means for moving the tire building drums longitudinally rearward until the drum reference point abuts against the work station longitudinal reference point.

According to the invention, the apparatus further comprises: means for independently moving forward each tire building drum; and means for flexibly connecting each tire building drum to a respective one of the forward moving means with a coupling which can be uncoupled. Furthermore, the apparatus comprises: means for coupling the work station to the tire building drum; means for uncoupling the tire building drum from the respective one of the forward moving means; and means for longitudinally moving the tire building drum relative to the respective one of the forward moving means. Preferably, the apparatus comprises means for holding the drum reference point against the work station longitudinal reference point. Preferably, the flexible connecting means allows controlled lateral and vertical movement of the tire building drum relative to the respective one of the forward moving means.

According to the invention, an apparatus for longitudinal registration of a movable tire building drum to an automated tire building system work station, wherein the automated tire building system comprises one or more work stations, and a plurality of tire building drums wherein each tire building drum is independently moved longitudinally forward into and out of each work station, comprises: an intake server located at the work station for meshing with and operating the movable tire building drum; a work station longitudinal reference point upon a forward facing surface of the intake server; a drum reference point upon a rearward-facing surface of the movable tire building drum; means for laterally extending the intake server rearward of the tire building drum; a flexible connection flexibly attached to the tire building drum, having a cam follower on a free end of the flexible connection; an intake actuator arm rotatably attached to the intake server; a box cam slot in the intake actuator arm for coupling with the can follower; and means for rotating the intake actuator arm after coupling with the cam follower for moving the tire building drum longitudinally rearward to abut the drum reference point against the work station longitudinal reference point.

According to the invention, the flexible connection further comprises: a coupling arm rotatably connected between the tire building drum and the cam follower; a crank arm rotatably connected between the coupling arm and the independent forward moving means such that the crank arm rotatably connects to a portion of the coupling arm located between the cam follower and the tire building drum connection. Even further, a self-propelled vehicle provides the independent forward moving means for the tire building drum; and the flexible connection is attached to the vehicle such that it has a closed position which couples the tire building drum to the vehicle for independently moving the tire building drum forward, and has an open position which uncouples the tire building drum from the vehicle to allow the tire building drum to be longitudinally moved relative to the vehicle. The flexible connection may further comprise: a stop arm and height adjustment screw positioned to counteract a vertical force component of a forward moving force imposed by the vehicle when the flexible connection is closed; and dimensions and angles such that forward moving force imposed on the flexible connection when it is closed also causes the flexible connection to remain closed. Furthermore, length for the box cam slot is provided to allow coupling with the cam follower when the vehicle halts at a specified range of different longitudinal positions within the work station. Furthermore, clearance between the crank arm and a bracket rotatably connecting the crank arm to the vehicle is provided to allow controlled lateral movement of the tire building drum relative to the vehicle.

The present invention is particularly useful in conjunction with a system for simultaneously building a plurality of tire carcasses, such as is disclosed in the aforementioned U.S. Patent Application Ser. No. 09/957,785 entitled METHOD FOR MANUFACTURING TIRES ON A FLEXIBLE Manufacturing SYSTEM. The method disclosed therein generally comprises the tire building steps of establishing a sequence of at least three and up to ten work stations; advancing at least three disconnected tire building drums along a working axis extending through the at least three work stations; and applying one or more tire components to the tire building drums at each of the work stations. Then the resulting green tire carcass is removed at the last of the work stations. Finally, the tire building drum is advanced from the last work station after the green carcass has been removed to the first work station. The tire building drums are each independently advanced along the working axis. Each of the disconnected tire building drums are advanced along the working axis so that the axis of rotation of the disconnected tire building drums is aligned with the working axis. The plurality of disconnected (i.e., independently movable, not connected to one another) tire building drums can be substantially simultaneously advanced along a working axis with self propelled devices to which the tire building drums are mounted from one work station to another. The tire building drums are advanced along the working axis so that an axis of rotation through the building drum is maintained at a constant predetermined height and location and in parallel alignment with the working axis. An intake server is located at each of the work stations for operating the tire building drums. The intake servers are coupled to the building drums while maintaining the axis of rotation through the building drums at the constant predetermined height and location and in parallel alignment with the working axis. The intake server at each of the work stations move from their normally retracted position outward across the working axis into a position to couple to that tire build drum. Then the building drums are uncoupled from the is intake servers after the tire component(s) have been applied to the building drums. Next, the intake server at each of the work stations are retracted to their normally retracted position, prior to the now uncoupled tire building drum advancing to the next work station. The step of applying one or more tire components to the tire building drums at each of the work stations includes applying the tire components to the tire building drums while maintaining the axis of rotation through the building drums at the constant predetermined height and location and in parallel alignment with the working axis. This is accomplished by providing one or more application drums at each of the work stations for applying the tire component(s) to the building drums. The application drums are moved from their normal retracted position away from the working axis to a location where the tire components can be applied to the building drums while maintaining the axis of rotation through the building drums at the constant predetermined height and location and in parallel alignment with the working axis. Then the application drums are retracted at each of the work stations to their normally retracted position, prior to advancing the tire building drum to the next work station.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1B:
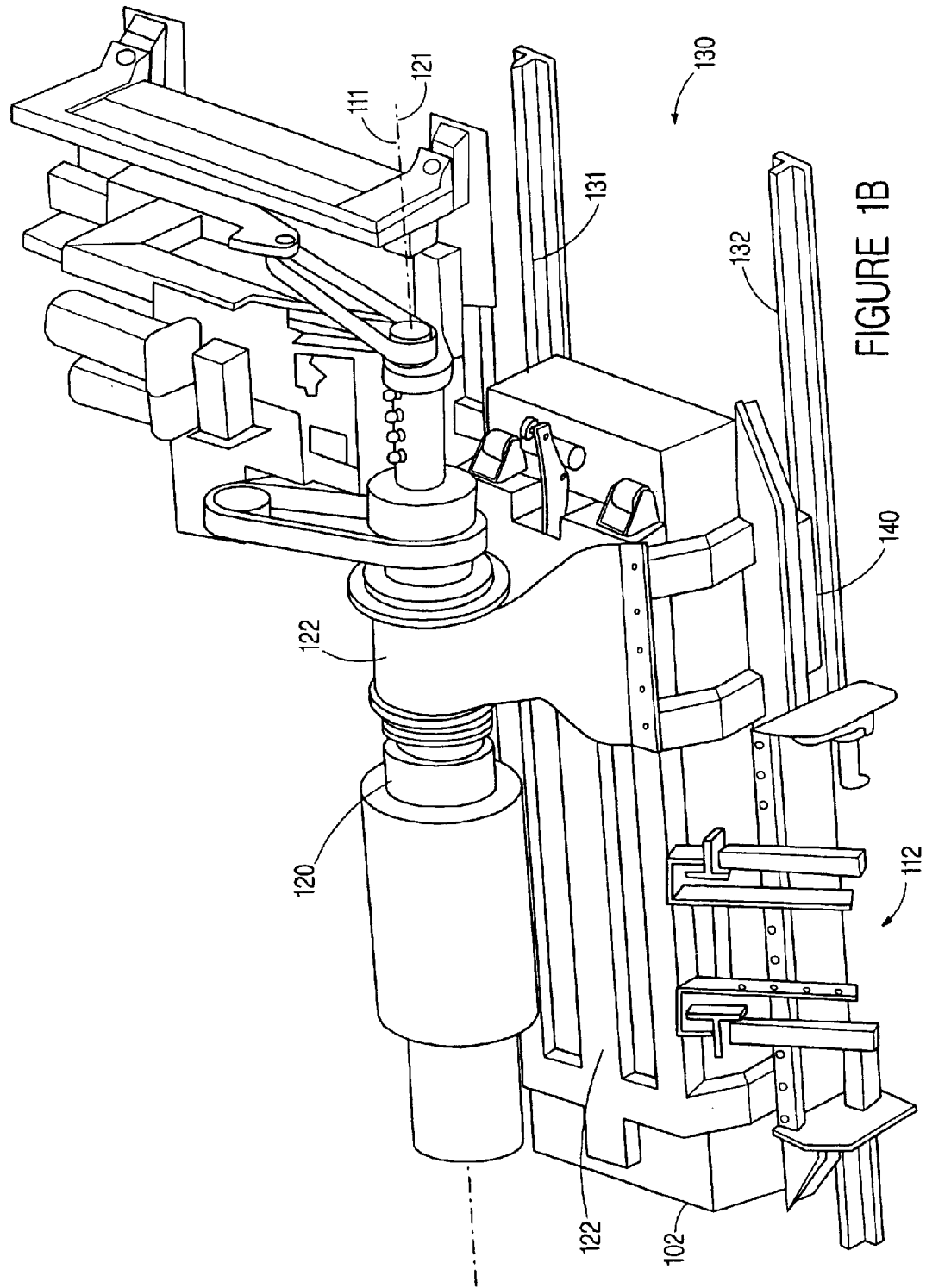

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

Figures 1C, 1D, 1E:
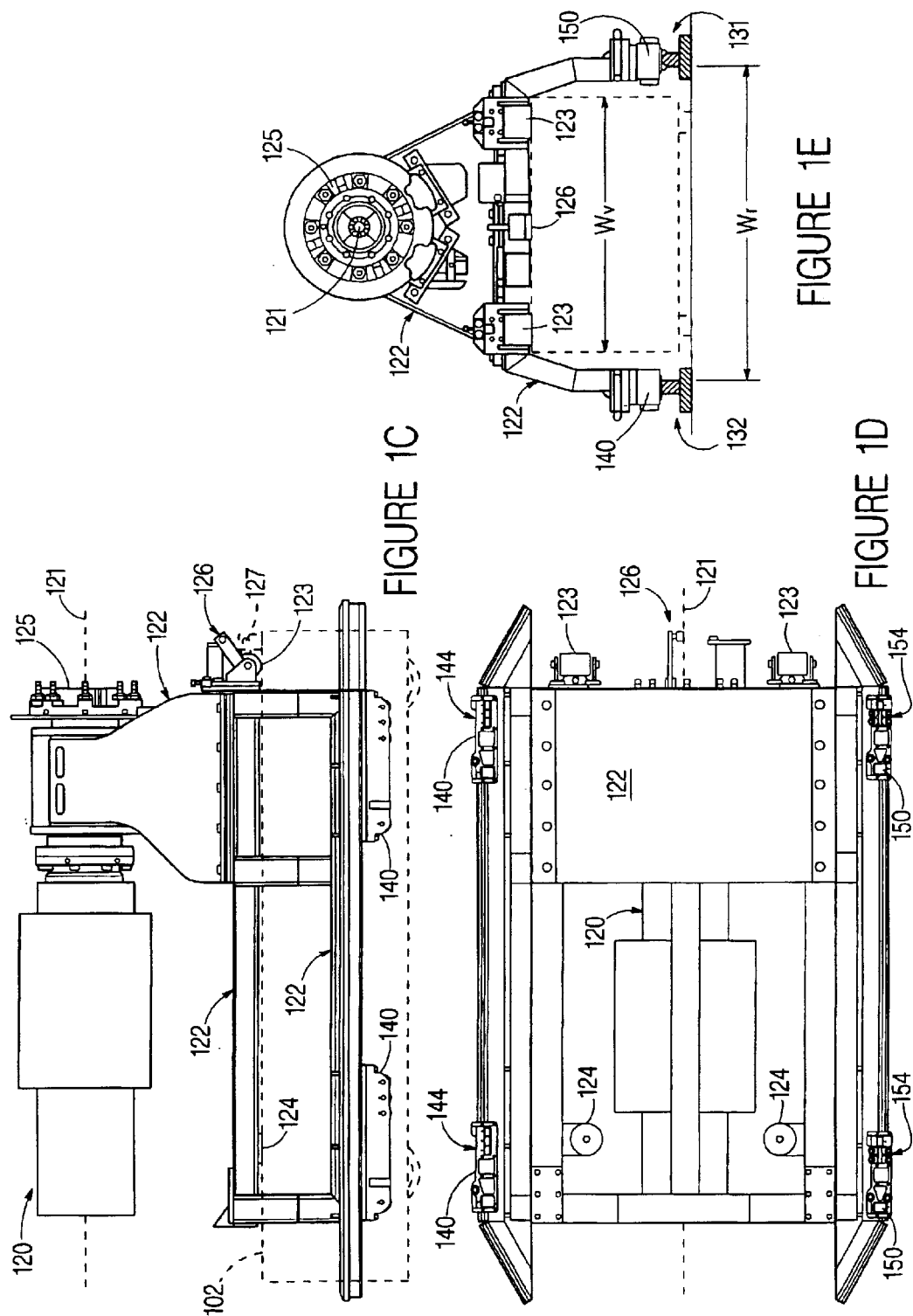
Figure 3A:
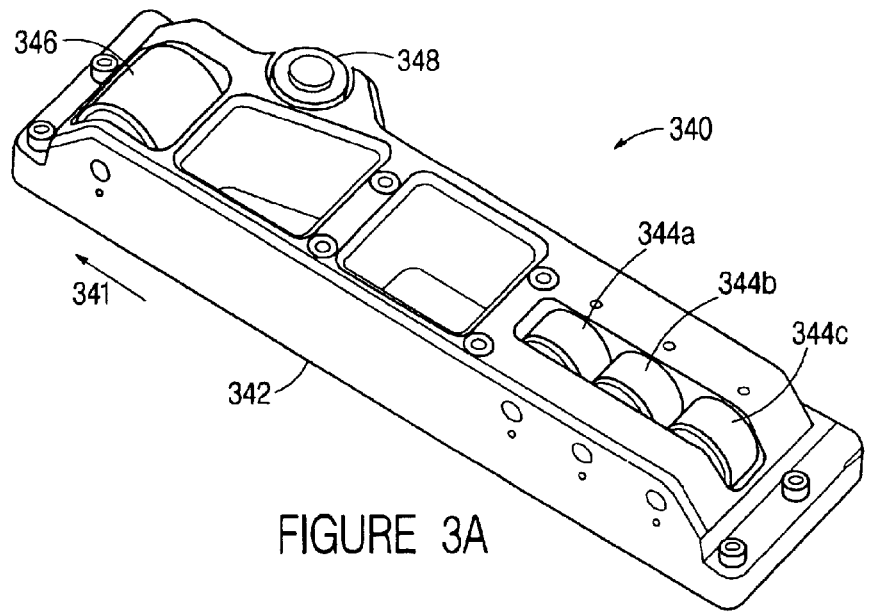
Figure 3B:
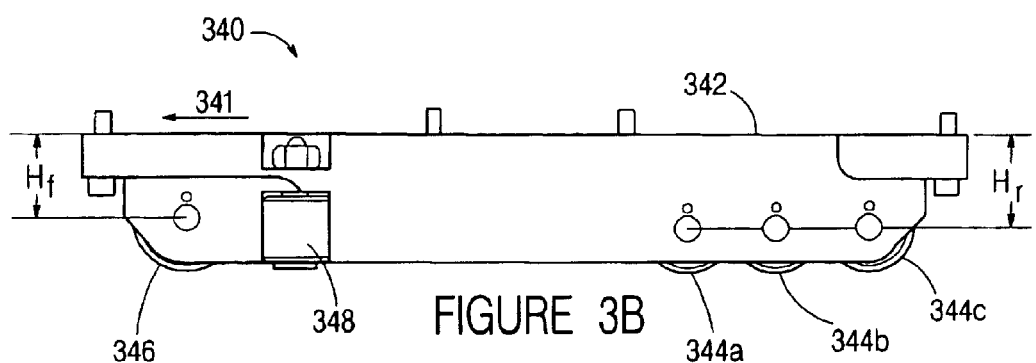
Figure 3C:
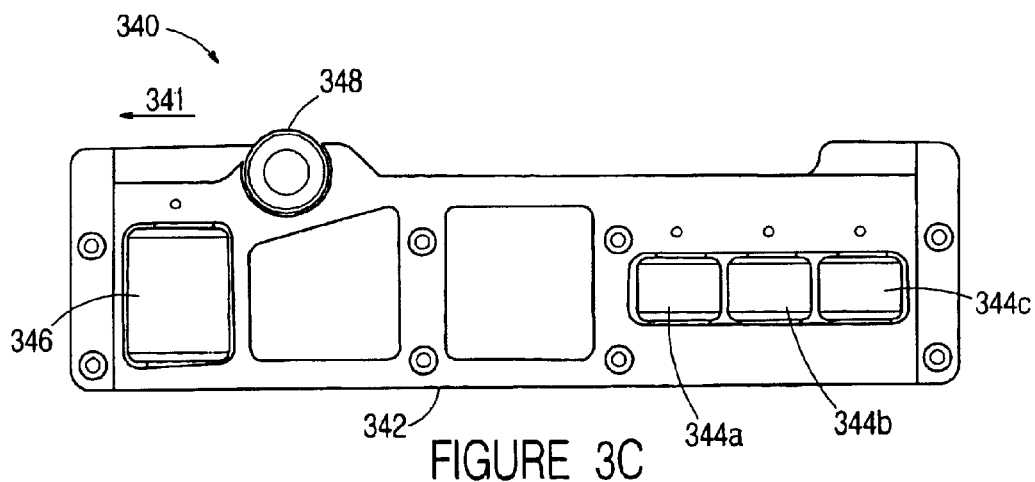
Figure 4A:
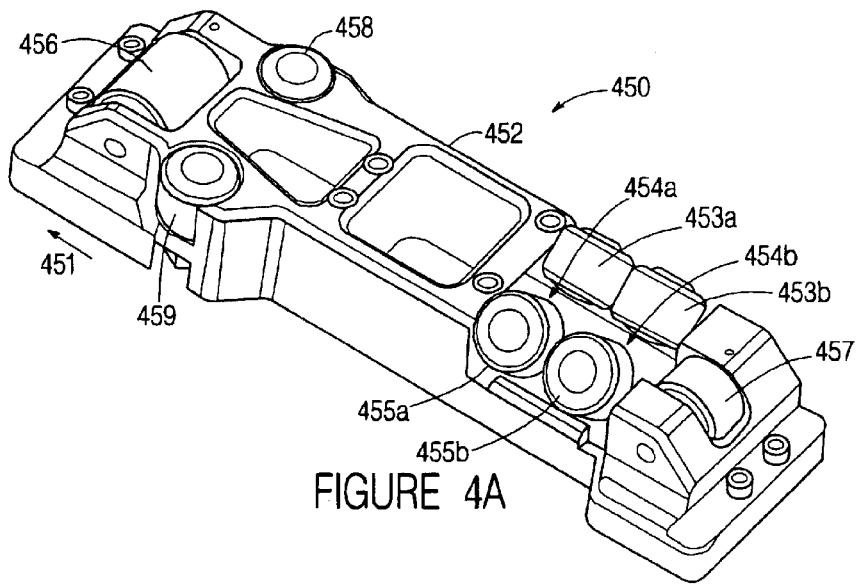
Figure 4B:
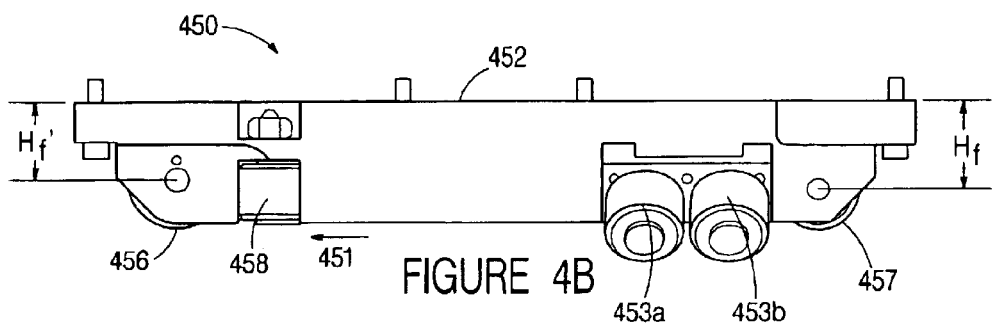
Figure 4C:
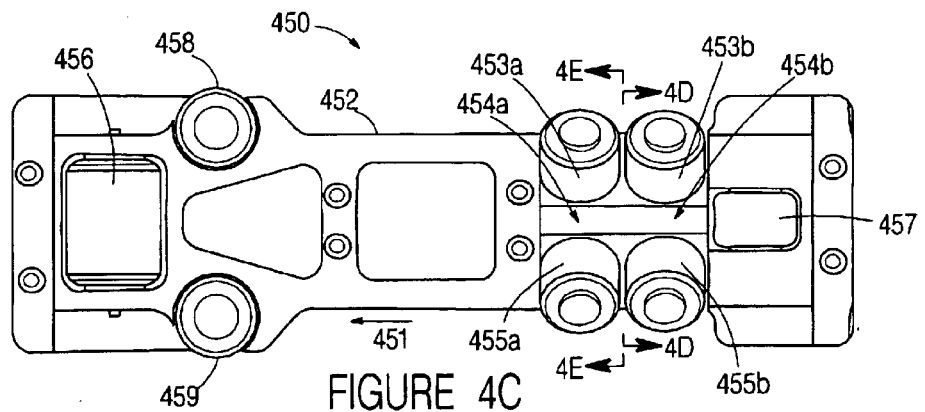
Figure 4D:
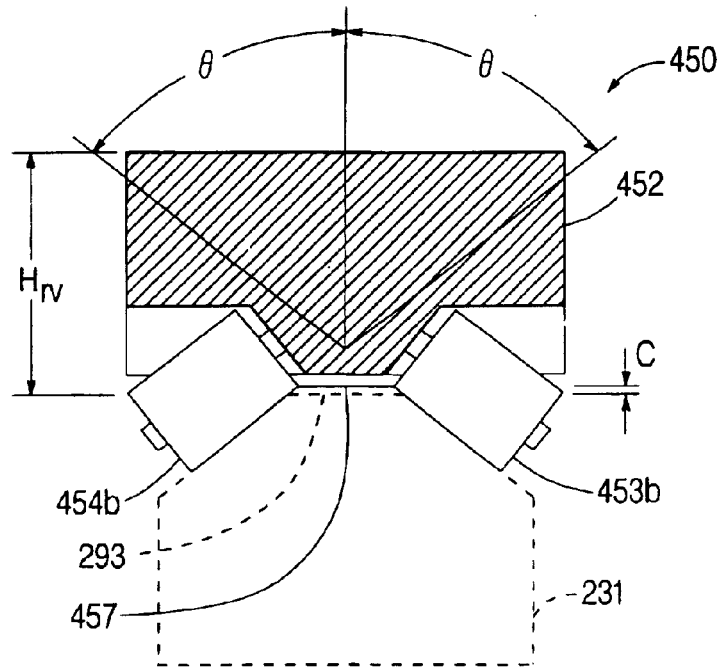
Figure 4E:
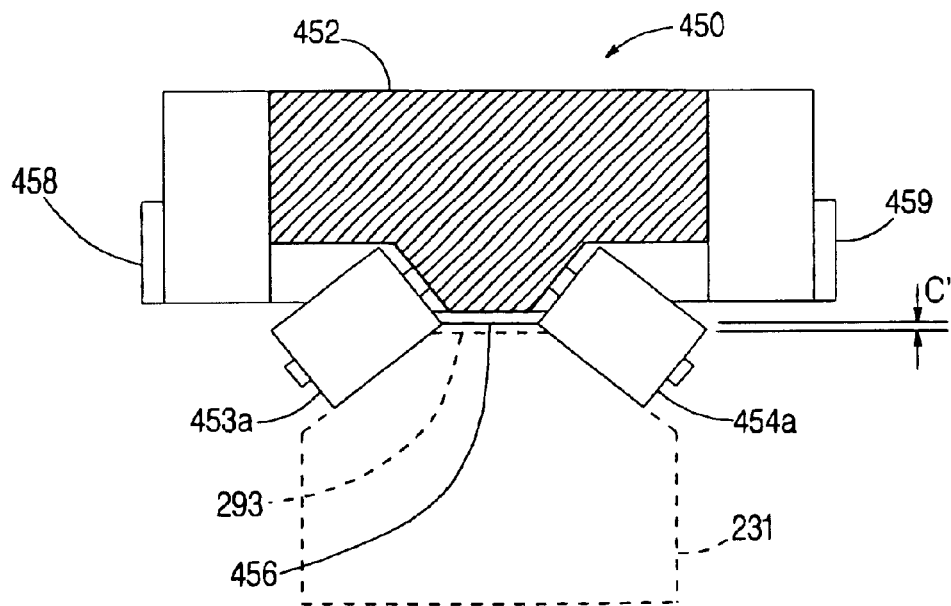
Figure 6A:
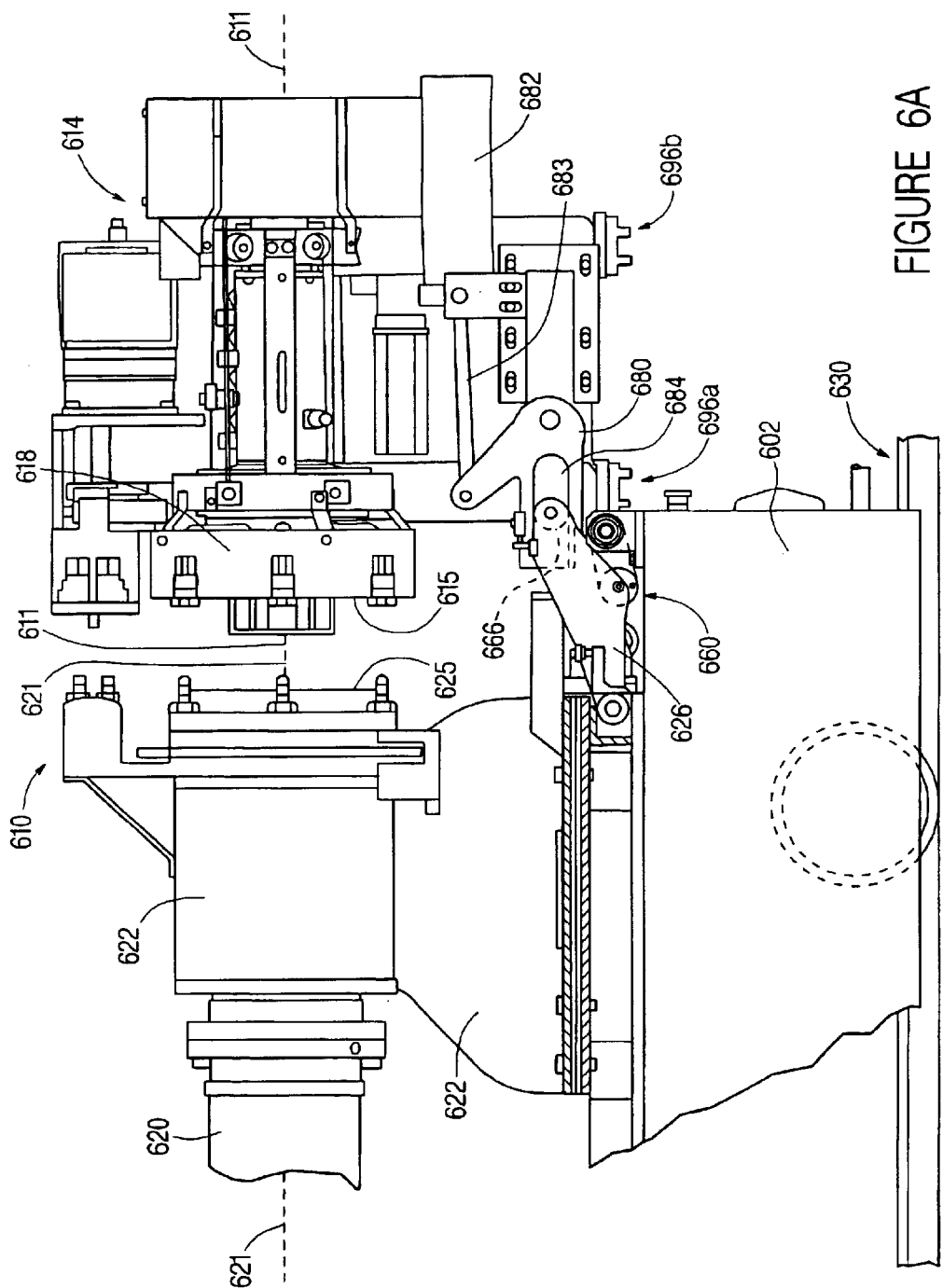
Figure 6B:
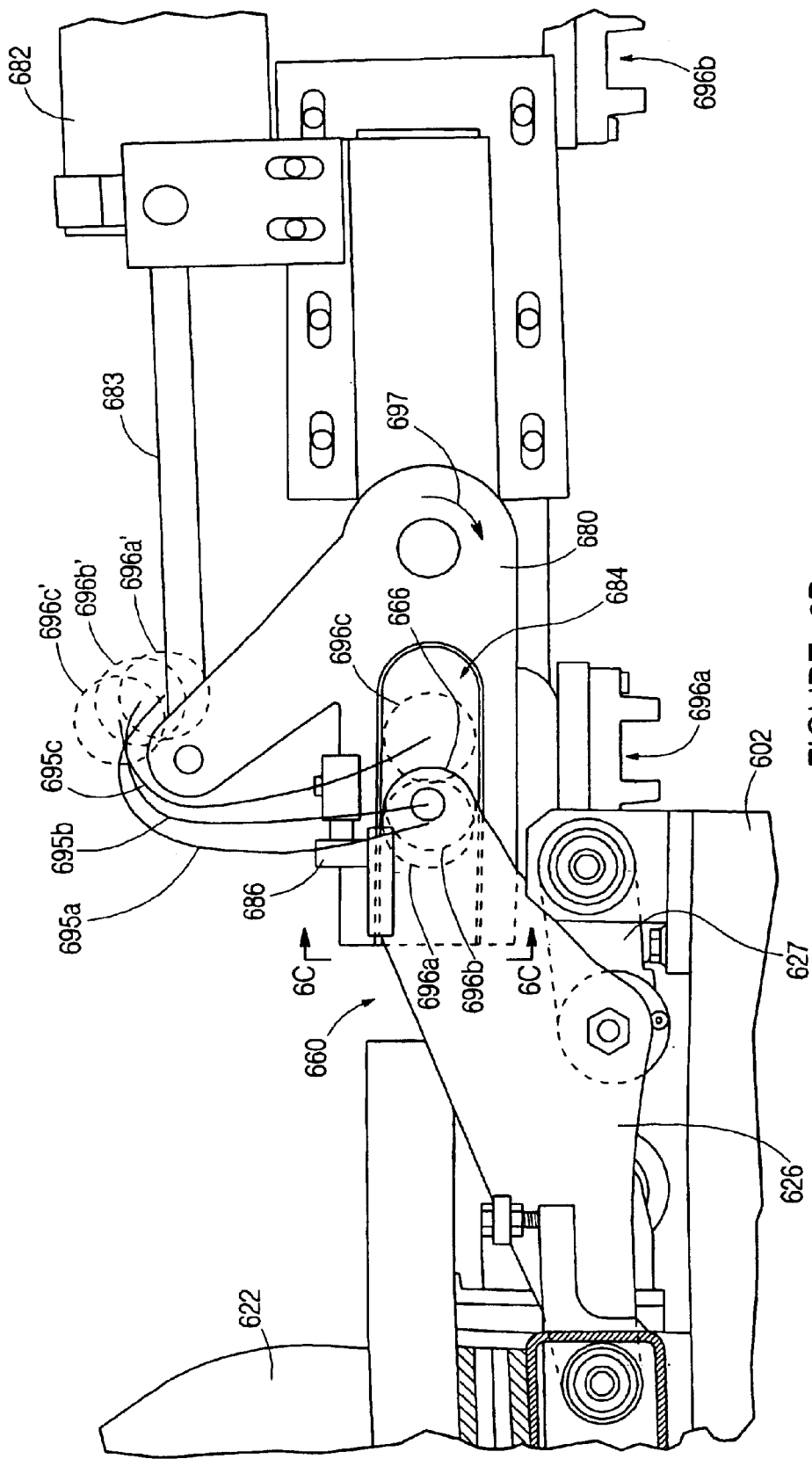
Figure 6C:
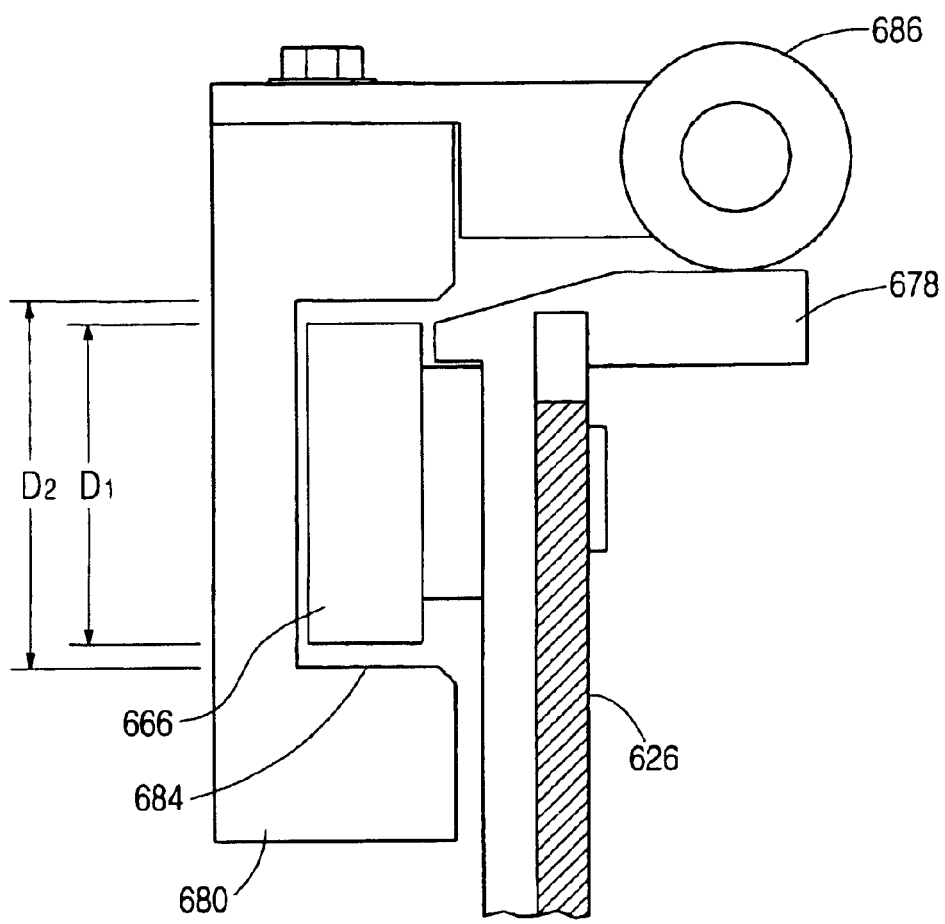

The structure, operation, and advantages of the present preferred embodiment of the invention will become further apparent upon consideration of the following description taken in conjunction with the accompanying drawings, wherein:

FIG. 1A is a schematic view of an automated tire building system (FMS), according to the invention;

FIG. 1B is a perspective view of a workstation of the FMS showing a tire building drum in precision placement relative to an application drum, according to the invention;

FIGS. 1C, 1D and 1E are three views (side, bottom and end view, respectively) of a tire building drum on a drum support frame, according to the invention;

FIG. 2A is a top view of a rail system, according to the invention;

FIG. 2B is a top view of a V-rail exit ramp of the rail system of FIG. 2A, according to the invention;

FIG. 2C is a top view of a V-rail entry ramp of the rail system of FIG. 2A, according to the invention;

FIG. 2D is a top view of a flat rail exit ramp of the rail system of FIG. 2A, according to the invention;

FIG. 2E is a top view of a flat rail entry ramp of the rail system of FIG. 2A, according to the invention;

FIG. 2F is a cross-sectional end view of the V-rail entry ramp of FIG. 2C, taken on the line 2F—2F, according to the invention;

FIG. 2G is a cross-sectional end view of the flat rail entry ramp of FIG. 2E, taken on the line 2G—2G, according to the invention;

FIG. 2H is a side view of the flat rail of the rail system of FIG. 2A, taken on the line 2H—2H shown in FIG. 2E, according to the invention;

FIG. 2I is a side view of the V-rail of the rail system of FIG. 2A, taken on the line 2I—2I shown in FIG. 2C, according to the invention;

FIGS. 3A, 3B and 3C are three views (perspective, side, and bottom view, respectively) of a flat skate, according to the invention;

FIGS. 4A, 4B and 4C are three views (perspective, side, and bottom view, respectively) of a V-skate, according to the invention;

FIG. 4D is a cross-sectional end view of the V-skate of FIG. 4C, taken on the line 4D—4D, according to the invention;

FIG. 4E is a cross-sectional end view of the V-skate of FIG. 4C, taken on the line 4E—4E, according to the invention;

FIG. 5A is a side view of an AGV-drum flexible connection in a closed position, according to the invention;

FIG. 5B is a perspective view of the opposite side of the AGV-drum flexible connection of FIG. 5A, according to the invention;

FIG. 5C is a side view of an AGV-drum flexible connection in an open position, according to the invention;

FIG. 5D is a perspective view of the AGV-drum flexible connection of FIG. 5C, according to the invention;

FIG. 6A is a cutaway side view of a tire building drum on a drum support frame above an AGV which has stopped in a work station forward of an intake server for that work station, according to the invention;

FIG. 6B is a magnified detail view of the AGV-drum flexible connection portion of the apparatus of FIG. 6A, according to the invention; and FIG. 6C is a cross-sectional view indicated by the arrows 6C—6C in FIG. 6B, according to the invention.

DETAILED DESCRIPTION OF THE INVENTION

The present invention concerns precision placement of a tire building drum relative to tools (tire building devices such as "application drums") of a work station when the tire building drum comprises a moving work-piece in an automated tire building system (FMS or flexible manufacturing system) having one or more work stations, and the tire building drum is moved (propelled) into and out of each work station. The application drums of each work station are aligned vertically and horizontally to a working axis, and are positioned longitudinally along the working axis, which working axis preferably extends linearly through all of the one or more work stations in sequence from first to last, such that the first tire building operations are performed in the first work station, and the last tire building operations are performed in the last work station. Thus, precision placement of the tire building drum at each work station can be accomplished by precisely aligning the axis of the tire building drum to the working axis at each work station, and by precisely positioning a tire building drum longitudinal reference point to a corresponding work station longitudinal reference point at each work station. Tire building drums are typically too large to allow the use of a precision pallet conveyor so, in the preferred embodiment, the tire building drums are moved by self-powered vehicles riding on wheels upon the plant floor. Since the vehicles, by themselves, are unable to achieve sufficient accuracy in positioning the tire building drums relative to the work station application drums, the present invention provides additional methods and means for precision placement of the tire building drum.

FIG. 1A illustrates a preferred embodiment of a tire building system (FMS) 100 incorporating the positioning methods and means of the present invention. A plurality of self-powered automatic guided vehicles (AGVs) 102a, 102b, 102c, 102d, 102e (collectively called "102") move corresponding tire building drums 120a, 120b, 120c, 120d, 120e (collectively called "120") through a plurality of work stations 110a, 110b, 110c, 110d (collectively called "110"), in the direction shown by arrows 105. The AGVs 102 follow a path determined by a guide wire 104 embedded in the plant floor, shown in FIG. 1A as an oval path passing through the work stations 110 from a first work station 110a to a last work station 110d, then looping back around to the first work station 110a. The work stations 110 are aligned to, and spaced along, a common, linear working axis 111, and the AGV guide wire 104 is approximately parallel to the working axis 111 where the guide wire 104 passes through the work stations 110. Also parallel to the working axis 111 and passing through the work stations 110 is a rail system 130 comprising a V-rail 131 (precisely parallel to the working axis 111), a flat rail 132 (approximately parallel to the working axis 111), a V-rail entry ramp 133, a V-rail exit ramp 135, a flat rail entry ramp 134, and a flat rail exit ramp 136. Each work station 110 comprises one or more application drums 112a, 112b, 112c, 112d, 112e, 112f, 112g(collectively called "112"), one or more supply reels 113a, 113b, 113c, 113d, 113e, 113f, 113g(collectively called "113"), and an intake server 114a, 114b, 114c, 114d (collectively called "114"). The application drums 112 are precisely aligned vertically and horizontally to the working axis 111, and are positioned longitudinally along the working axis 111 relative to a work station longitudinal reference point 115a, 115b, 115c, 115d (collectively called "115") established for each work station 110, for example on a forward surface of the intake server 114. Although self-powered, and automated to follow the guide wire 104, the AGVs 102 are also subject to external control, for example by radio signal and/or proximity switches, so that the AGVs 102 can be controlled to stop at each work station 110 for a suitable amount of time before proceeding to the next work station 110.

An exemplary sequence of operations for the tire building FMS 100 is as follows, wherein a green tire carcass is built. For the first step of a green tire carcass building process, the AGV 102a moves an empty tire building drum 120a into the first work station 110a and stops approximately at a desired stopping point within the first work station 110a. The intake server 114a extends laterally (in the direction of the arrow 107) to a position rearward of the tire building drum 120a, couples to the tire building drum 120a while uncoupling the tire building drum 120a from the AGV 102a, and moves the tire building drum 120a into a precision longitudinal position by abutting a drum reference point 125 (as shown in FIG. 1C) against the work station longitudinal reference point 115a. Simultaneously, as will be described in detail hereinbelow, the tire building drum 120a is precisely aligned with the working axis 111 by the rail system 130, thereby providing precision placement in three dimensions of the tire building drum 120a relative to the application drums 112a, 112e of the first work station 110a. Now the application drums 112 can apply the first layers of tire components, pulling the components from their supply reels 113. In the preferred embodiment, power and control signals are communicated to/from the tire building drum 120 by the intake server 115. For example: one innerliner is pulled from the supply reel 113e and applied by the application drum 112e, and a pair of toe guards are pulled from the (double) supply reel 113a and applied by the application drum 112a. When the application processes are completed in the workstation 110a, the intake server 114a releases the tire building drum 120a and re-couples it to the AGV 102a, uncouples and retracts to a position clear of the path of the AGVs 102 and tire building drums 120, thereby allowing the AGV 102a to move the tire building drum 120a to the next work station 110b. In order to clear the way, all AGVs 102 present in workstations 110 move approximately simultaneously, but do not have to be connected together. For the next step of the green tire carcass building process, the AGV 102a moves the tire building drum 120a into the second work station 110b whereupon operations similar to those described for the first work station 110a are performed, thereby applying further tire carcass components from the supply reels 113b, 113f of the second work station 110b. At approximately the same time, the AGV 102e has moved an empty tire building drum 102e into the first workstation 110a for application of the first tire carcass components. The above steps are repeated as the AGVs 102 move the tire building drums 120 through all of the work stations 110 in sequence, so that the tire carcass components are applied in their proper sequence on the tire building drums 120. After completion of the application of components in the last work station 110d, the built green tire carcass may be removed from the tire building drum 120 for further processing in subsequent tire manufacturing stages (not shown), thus emptying the tire building drum 120e so that it may be moved by the AGV 102e back around the path of the guide wire 104, ready to start another green tire carcass building process in the first work station 110a. An inside bead wire ring may be applied to the empty tire building drum 120e at any time after removing the built green tire carcass, conveniently as part of the carcass removal operation in the last workstation 110d.

FIG. 1B illustrates a workstation 110 with a tire building drum 120 in precision placement relative to an application drum 112 (partially shown in cutaway). The intake server 114 is extended and coupled to the tire building drum 120, thereby establishing a precise longitudinal position for the tire building drum 120. The tire building drum 120 is supported by a drum support frame 122 which in turn sits above the AGV 102. A portion of the rail system 130 comprising the V-rail 131 and the flat rail 132 is shown supporting and aligning the tire building drum 120 through skates (one flat skate 140 visible) attached to the bottom of the drum support frame 122, thereby precisely aligning the tire-building drum 120 with the working axis 111, i.e., making an axis of rotation 121 (also see FIG. 1E) of the tire building drum 120 precisely coincident with the working axis 111.

FIGS. 1C, 1D, and 1E illustrate side, bottom, and rear end views, respectively, of the drum support frame 122 with important elements attached thereupon. For reference, an AGV 102 is shown in dashed outline in FIGS. 1C and 1E, and cross-sections of the V-rail 131 and flat rail 132 are shown in FIG. 1E. The tire building drum 120 is cantilever mounted to the drum support frame 122 to allow complete rings such as tire beads to be applied during tire building, and also to allow a completed green tire carcass to be removed. The tire building drum 120 is rotatable about a central axis of rotation 121 rotating in one or more bearings (not shown) between the tire building drum 120 and the drum support frame 122.

The drum reference point 125 is a rear-facing end surface of the tire building drum 120, but could be any fixed point on the tire building drum 120 or drum support frame 122. Because of the potential for "play" in the bearing connection between drum and frame, it is preferable to make the drum reference point 125 a rigid part of the tire building drum 120, such as shown, in order to achieve the best precision in longitudinal positioning of the tire building drum 120. A coupling arm 126 is attached to the rear end of the drum support frame 122 and is used by the intake server 114 to move the tire building drum 120 into a precision longitudinal position by mating the drum reference point 125 with the work station longitudinal reference point 115 (see FIG. 1A) of the workstation 110. The coupling arm 126 is also flexibly attached to the AGV 102 via a crank arm 127, thus providing means for the AGV to move the drum support frame 122, and thus the tire building drum 120, even when the drum support frame 122 is not directly resting on top of the AGV 102, i.e., when the tire building drum 120 is riding on the rail system 130. Otherwise, when not riding on the rail system 130, the drum support frame 122 has a pair of rollers 123 and a pair of pads 124 to support it when resting on top of the AGV 102. The flexible connection 126/127 between the drum support frame 122 and the AGV 102 which is provided by the coupling arm 126 and crank arm 127 enables the AGV 102 to move the drum support frame 122 (and therefore the tire building drum 120) while also allowing limited movement of the drum support frame 122 relative to the AGV 102 as the tire building drum 120 is raised, lowered and shifted laterally by the rail system 130 for precision alignment with the working axis 111; and also allowing temporary uncoupling for precision longitudinal positioning.

To enable precision alignment of the tire building drum 120 with the working axis 111, skates 140, 150 with bearing rollers 144, 154, respectively, designed to ride on the rails 132, 131, respectively, of the rail system 130 are attached to the underside of the drum support frame 122. Two skates, one fore and one aft, on each side of the drum support frame 122 assure alignment of the axis of rotation 121 over the entire length of the tire building drum. It should be noted that, although multiple bearing rollers are used in the skates 140, 150 in order to adequately support the weight of the drum support frame 122 and attachments, a minimum arrangement sufficient for precision alignment would comprise two pairs of V-mounted bearing rollers 154 on the V-rail side of the drum support frame 122, and a single flat bearing roller 144 on the flat rail side of the drum support frame 122. In order to provide an adequate tripod support as well as adequate positioning control, the two pairs of V-mounted bearing rollers 154 should be spaced apart (in one or two skates), preferably placed as shown for the V-skates 150 in FIG. 1D close to the fore and aft ends of the drum support frame 122; and the single flat bearing roller 144 should preferably be placed close to the fore-aft middle of the opposite side of the drum support frame 122. Especially in light of the description hereinbelow of the skate 140, 150 and rail 131, 132 designs, it will be seen that two pairs of properly positioned V-mounted bearing rollers 154 riding on a properly aligned V-rail 131 will provide alignment in the horizontal plane; that a single flat bearing roller 144 riding on a flat rail 132 positioned with the proper height will provide alignment in the vertical plane; and that the triangular arrangement of two pairs of V-mounted bearing rollers 154 riding on a V-rail 131 plus a single flat bearing roller 144 riding on a flat rail 132 will provide stable tripod support of the drum support frame 122 (assuming a suitable base area-to-height ratio).

Alignment of Tire Building Drum to Working Axis

FIG. 2A illustrates the rail system 230 (compare 130), and FIGS. 2B–2I illustrate features of the rail system 230 in other views. The rail system 230 comprises a V-rail 231 (compare 131) and a flat rail 232 (compare 132) which are approximately parallel and spaced apart by a width "Wr" that is large enough to accommodate the width "Wv" of the AGV 102 (see FIG. 1E) which must pass between the rails 231, 232. As described hereinabove, when suitably affixed to a supporting surface (e.g., the plant floor), the rail system 230 passes through the FMS 100 work stations 110; the V-rail 231 is precisely parallel to the working axis 111; the flat rail 232 is approximately parallel to the V-rail 231; and the heights of the rails 231, 232 are adjusted to provide precision alignment of the tire building drum 120 when it is supported by a drum support frame 122 having attached skates 150, 140 which are riding on the rails 231, 232, respectively. It should be understood that, since the skates 150, 140 ride on upper surfaces 291, 292 of the rails 231, 232, respectively, therefore it is the upper ridden-upon (i.e., bearing) surfaces 291, 292 which require the aforementioned parallelism and adjusted heights. In order to avoid sliding wear, the flat rail 232 is preferably made to be as nearly parallel as possible to the V-rail 231. The rail system 230 further comprises a V-rail entry ramp 233 (compare 133), a V-rail exit ramp 235 (compare 135), a flat rail entry ramp 234 (compare 134), and a flat rail exit ramp 236 (compare 136). Each rail 231, 232 is preferably a single length of steel or other suitable material, but may be composed of shorter lengths combined by known means to be suitably linear and smooth-surfaced. Base plates 239a, 239b are optionally affixed to the rails 231, 232 and ramps 233, 234, 235, 236 (e.g., by screws) to provide, for example, a broader base, extra rigidity, convenient flanges for floor attachment, a means for holding together all the various parts of the rail system 230, and etc. Each base plate 239a, 239b is preferably a single length of steel or other suitable material, but may be composed of shorter lengths preferably combined in away such that the resulting joints are not coincident with joints of the other various parts of the rail system 230.

With reference to the cross-sectional view of FIG. 2G, the flat rail 232 is seen to have a substantially linear, level, horizontal and "flat" upper surface 292 extending across the width and continuously from end to end, although the long edges can be beveled or rounded to avoid sharp corners. The flat rail 232 is preferably a single length of steel or other suitable material, but may be composed of shorter lengths preferably combined in a way such that the resulting joints are not coincident with joints of the other various parts of the rail system 230 (e.g., the base plate(s) 239b), and the joints should not introduce any irregularity in the flat upper surface 292 of the flat rail 232. With reference to FIGS. 2A, 2D and 2E, an entering end of the flat rail 232 joins the flat rail entry ramp 234 in a joint without irregularity in the upper surface 292, and an exiting end of the flat rail 232 joins the flat rail exit ramp 236 in a joint without irregularity in the upper surface 292.

With reference to the cross-sectional view of FIG. 2F, the V-rail 231 is seen to have a substantially linear, truncated inverted V-shaped upper surface 291/293 extending continuously from end to end. The two side upper surfaces 291 (291a, 291b) of the inverted V-shape are at equal angles θ with respect to the vertical, and the angle θ is preferably 45 degrees so that the reaction forces of the V-rail 231 to the weight of a V-skate 150 are directed equally upward for support and laterally for alignment. The vertex of the inverted V-shape is sufficiently truncated to create a flat surface 293 providing clearance for flat rollers also present on the V-skate 150, as will be described hereinbelow. The V-rail 231 is preferably a single length of steel or other suitable material, but may be composed of shorter lengths preferably combined in a way such that the resulting joints are not coincident with joints of the other various parts of the rail system 230 (e.g., the base plate(s) 239a), and the joints should not introduce any irregularity in the upper surfaces 291/293 of the V-rail 231. With reference to FIGS. 2A, 2B and 2C, an entering end of the V-rail 231 joins the V-rail entry ramp 233 in a joint without irregularity in the upper surfaces 291/293, and an exiting end of the V-rail 231 joins the V-rail exit ramp 235 in a joint without irregularity in the upper surfaces 291/293.

To facilitate entry of the skates 150, 140 onto the rails 231, 232 respectively, entry ramps 233, 234 are provided. Referring to FIGS. 2H and 2I, the side cross-section view illustrates how the entry ramps 233, 234 provide flat upper surfaces 293, 292 with a gradual upward slope of angle α which is on the order of a few degrees, for example 2 degrees, so that even a relatively fast moving AGV 102 will still produce a smooth gradual raising up of the tire building drum 120 as the skates 150, 140 roll up the entry ramps 233, 234. With reference to the detail views of FIGS. 2C and 2E, and the cross-sectional views of FIGS. 2F and 2G, it can be seen that both the V-rail entry ramp 233 and the flat rail entry ramp 234 provide a flat surface 293, 292, respectively, upon which a flat roller rides up the ramp of angle α. In the case of the V-rail entry ramp 233, it is the truncated vertex of the V-shaped railing that provides the flat surface 293. As will be discussed hereinbelow, the V-skate 150 has a special flat roller (456 in FIG. 4A) on its forward end to enable the V-skate 150, 450 to smoothly ride up the V-rail entry ramp 233. A person skilled in the relevant arts will appreciate that roller pairs V-mounted in a horizontal skate cannot roll up a ramped V-rail without also sliding, which causes undesirable wear.

To facilitate exit of the skates 150, 140 off the rails 231, 232 respectively, exit ramps 235, 236 are provided. Referring to FIGS. 2H and 2I, the side cross-section view illustrates how the exit ramps 235, 236 provide flat upper surfaces 293, 292 with a gradual downward slope of angle β which is on the order of a few degrees, for example 2 degrees, so that even a relatively fast moving AGV 102 will still produce a smooth gradual lowering down of the tire building drum 120 as the skates 150, 140 roll down the exit ramps 235, 236. With reference to the detail views of FIGS. 2B and 2D, it can be seen that both the V-rail exit ramp 235 and the flat rail exit ramp 236 provide a flat surface 293, 292, respectively, upon which a flat roller rides down the ramp of angle β. In the case of the V-rail exit ramp 235, as in the case of the V-rail entry ramp 233, it is the truncated vertex of the V-shaped railing that provides the flat surface 293. As will be discussed hereinbelow, the V-skate 150 has a special flat roller (457 in FIG. 4A) on its rearward end to enable the V-skate 150, 450 to smoothly ride down the V-rail exit ramp 235.

FIGS. 2C, 2E, 2F, and 2G also illustrate side ramp features of the rail system 230 which provide funneling of skates 150, 450, 140, 340 entering the rail system 230. Since the V-skate 150, 450 provides precision lateral positioning when the V-mounted bearing roller pairs 154, 454 are riding on the V-rail 231, it is important to funnel in the V-skate 150, 450 as it enters the rail system 230 via the V-rail entry ramp 233. Side ramps 237, 238a having a suitable entry angle γ (e.g., approximately 5 degrees) mounted as shown on both sides of the V-rail entry ramp 233 cause lateral alignment of the V-skate 150, 450 with the V-rail 231. Since the V-skate 150, 450 is attached to the drum support frame 122, lateral alignment of the V-skate 150, 450 also produces lateral alignment of the drum support frame 122 and all other components attached to it, such as the tire building drum 120 and the flat skate 140, 340. An alternative funneling method assumes consistent spacing between the V-skate 150, 450 mounted on one side of the drum support frame 122 and a corresponding flat skate 140, 340 mounted on the opposing side of the drum support frame 122, and therefore comprises the side ramp 237 mounted outward of the V-rail entry ramp 233 plus a side ramp 238b mounted outward of the flat rail entry ramp 234 (as an alternative to the side ramp 238a mounted inward of the V-rail entry ramp 233). All of the side ramps 237, 238a, 238b have a similar suitable entry angle γ (e.g., approximately 5 degrees). As will be seen from the skate descriptions hereinbelow, the V-skates 150, 450 (and the flat skates 140, 340) have vertical side rollers 459 and 458 or 348 suitably mounted for rolling against the side ramps 237 and 238a or 238b. It may be noted that V-mounted bearing roller pairs 154, 454 will naturally provide a certain amount of centering (funneling) when they come into contact with the V-rail 231, but the amount of centering is limited, and will cause sliding wear on the V-rail 231 and bearing rollers of the roller pairs 154, 454, therefore it is advantageous to utilize the inventive side ramps 237 and 238a or 238b and side rollers 459 and 458 or 348 which provide the desired centering with rolling action rather than wear-producing sliding.

FIGS. 3A, 3B, and 3C illustrate, in various views, a flat skate 340 (compare 140) suitable for use with the rail system 230 of the tire building FMS 100. The flat skate 340 is designed for rolling on the flat rail 232 in the direction indicated by an arrow 341. At a minimum, the flat skate 340 comprises a rigid flat skate body 342 holding at least one flat bearing roller 344. The flat bearing rollers 344 are made of a hard durable material, preferably steel, and include shafts and bushings or preferably roller bearings suitable for bearing the weight load imposed on them while maintaining a roller radius with a precision compatible with the overall system requirements for the precision alignment of the tire building drum 120. In the illustrated embodiment, there are three flat bearing rollers 344 (344a, 344b, 344c) to suitably divide up the weight load on the flat skate 340. The flat skate body 342 is partly cut away behind the rear-most flat bearing rollers 344c to allow clearance for rolling down the flat rail exit ramp 236. A front roller 346 is provided for rolling up the flat rail entry ramp 234 and the flat skate body 342 is suitably partly cut away in front of the front roller 346. The front roller 346 is preferably wider than the flat bearing rollers 344, and also is mounted at a height Hf slightly less than the mounting height Hr of the flat bearing rollers 344. The extra width assures that the front roller 346 will accommodate normally occurring misalignment of the flat skate 340 and the flat rail 232 by engaging with the top surface 292 of the flat rail entry ramp 234 while the side ramps 237 and 238a or 238b funnel the skate 340 laterally to center the flat bearing rollers 344 on the flat rail 232. While being funneled, the front roller 346 may be caused to slide laterally, thereby possibly causing uneven wearing of the front roller 346 rolling surface, therefore the lesser mounting height Hf is employed to prevent the front roller 346 from bearing weight when the flat skate 340 is rolling on the horizontal flat upper surface 292 of the flat rail 232. Also illustrated for this embodiment of the flat skate 340 is a vertical side roller 348 protruding from the outside edge of the leading end of the flat skate 340 and suitable for rolling against the optional side ramp 238b. The flat skate body 342 is suitably partly cut away around the outward portion of the side roller 348.

FIGS. 4A, 4B, 4C, 4D, and 4E illustrate, in various views, a V-skate 450 (compare 150) suitable for use with the rail system 230 of the tire building FMS 100. The V-skate 450 is designed for rolling on the V-rail 231 in the direction indicated by an arrow 451. At a minimum, the V-skate 450 comprises a rigid V-skate body 452 holding at least one V-mounted bearing roller pair 454 comprising two bearing rollers 453/455 which are V-mounted with their rolling surfaces at equal angles θ with respect to the vertical (see FIG. 4D), wherein the angle θ is substantially the same as the angle 0 of the two side upper surfaces 291 of the inverted V-shape of the V-rail 232 (see FIG. 2F). The V-mounted bearing rollers 453/455 are made of a hard durable material, preferably steel, and include shafts and bushings or preferably roller bearings suitable for bearing the weight load imposed on them while maintaining a roller radius with a precision compatible with the overall system requirements for the precision alignment of the tire building drum 120. In the illustrated embodiment, there are two V-mounted bearing roller pairs 454 (454a, 454b) to suitably divide up the weight load on the V-skate 450, each V-mounted bearing roller pair 454 comprising two bearing rollers 453/455 (453a/455a, 453b/455b). A flat rear roller 457 is provided for rolling down the flat truncated vertex upper surface 293 of the V-rail exit ramp 235 and the V-skate body 452 is suitably partly cut away behind the rear roller 457. A front roller 456 is provided for rolling up the flat truncated vertex upper surface of the V-rail entry ramp 233 and the V-skate body 452 is suitably partly cut away in front of the front roller 456. The front roller 456 is preferably wide enough to assure that the front roller 456 will accommodate normally occurring misalignment of the V-skate 450 and the V-rail 231 by engaging with the flat truncated vertex upper surface 293 of the V-rail entry ramp 233 while the side ramps 237 and 238a or 238b funnel the skate 450 laterally to center the V-mounted bearing roller pairs 454 on the V-rail 231. With reference to FIGS. 4B and 4D, the rear roller 457 is mounted at a height Hf determined so that when the V-mounted bearing roller pairs 454 are riding on the V-rail 231 (shown with dashed outline in FIG. 4D), then only the V-mounted bearing roller pairs 454 and not the rear roller 457 touch the V-rail 231 after the V-skate 450 has finished entering the rail system 230, i.e., there is a nonzero clearance C between the rear roller 457 and the flat truncated vertex upper surface 293 of the V-rail 231 which surface is at a relative height Hrv. With reference to FIGS. 4B and 4E, the front roller 456 is mounted at a height Hf (possibly equal to Hf) determined so that when the V-mounted bearing roller pairs 454 are riding on the V-rail 231 (shown with dashed outline in FIG. 4E), then only the V-mounted bearing roller pairs 454 and not the front roller 456 touch the V-rail 231 until the V-skate 450 is exiting the rail system 230, i.e., there is a nonzero clearance C' (possibly equal to C) between the front roller 456 and the flat truncated vertex upper surface 293 of the V-rail 231 which surface is at a relative height Hrv. Also illustrated for this embodiment of the V-skate 450 is a vertical side roller 459 protruding from the outside edge of the leading end of the V-skate 450 and suitable for rolling against the side ramp 237; and a side roller 458 protruding from the inside edge of the leading end of the V-skate 450 and suitable for rolling against the optional side ramp 238a. The V-skate body 452 is suitably partly cut away around the outward portion of the side rollers 458, 459.

As described hereinabove, two alternative funneling methods may be employed according to the invention: a preferred method using side ramps 237 and 238a with corresponding side rollers 459 and 458, respectively; and an alternative method using side ramps 237 and 238b with corresponding side rollers 459 and 348, respectively. Of course it may be convenient to make a single design of flat skate 340 with a flat skate body 342 which enables installation of the side roller 348 as shown in FIG. 3A, and a single design of V-skate 450 with a V-skate body 452 which enables installation of both of the side rollers 458 and 459 as shown in FIG. 4A. These skate designs then allow the user to determine which funneling method is employed by simply mounting the appropriate side ramps 237 and 238a or 237 and 238b. Whichever of the side rollers 348 and 458 are not needed could be left unmounted, as a cost savings.

A detailed description has been presented for apparatus which enables a method for precision alignment of a moving tire building drum 120 to a working axis 111 of an automated tire building system (FMS) 100, wherein the illustrated embodiment of the automated tire building system 100 comprises four work stations 110 with application drums 112 aligned to the working axis 111, and the tire building drum 120 is moved into and out of each work station 110. The method for precision alignment utilizes a rigid two-sided drum support frame 122 having, under one side of the drum support frame 122, one or more flat skates 140, 340 comprising precision roller skates having a total of at least one flat bearing roller 144, 344; and, under the other side of the drum support frame 122, having one or more V-skates 150, 450 comprising precision roller skates having a total of at least two pairs 154, 454 of V-mounted bearing rollers 453/455; and utilizing a rail system 130, 230 comprising first and second approximately parallel rails passing through the work stations 110, wherein the first rail is a flat rail 132, 232 which is substantially flat-topped, and the second rail is a V-rail 131, 231 which is substantially inverted V-shaped on top. The method positions the drum support frame 122, the flat skates 140, 340, and the V-skates 150, 450 relative to the tire building drum 120, the flat rail 132, 232 and the V-rail 131, 231; and positions the flat rail 132, 232 and the V-rail 131, 231 relative to the working axis 111; such that when the flat skates 140, 340 ride on the flat rail 132, 232, and the V-skates 150, 450 ride on the V-rail 131, 231, the tire building drum 120 is precision aligned to the working axis 111, i.e., the axis of rotation 121 of the tire building drum 120 is precision aligned to the working axis 111 of the work stations 110 of the automated tire building system (FMS) 100.

The inventive method includes causing the one or more flat skates 140, 340 to ride on the flat rail 132, 232, and causing the one or more V-skates 150, 450 to ride on the V-rail 131, 231 at least when the tire building drum 120 is in a work station 110. When not in a work station 110, the tire building drum 120 may be moved along an arbitrary path such as the oval path determined by the guide wire 104, and does not have to be riding on a rail system 130, 230, so the method further comprises causing the tire building drum 120 to enter a precision aligned state from a non-aligned state, and also comprises causing the tire building drum 120 to exit from a precision aligned state to a non-aligned state. To enable entering into a precision aligned state from a non-aligned state, a flat rail entry ramp 134, 234 is provided at the entry end of the flat rail 132, 232; a V-rail entry ramp 133, 233 is provided at the entry end of the V-rail 131, 231; gradually up-sloping flat upper surfaces 293, 292 and funneling side ramps 237 and 238a or 238b are provided for the entry ramps 134, 234, 133, 233; flat front rollers 346, 456 and vertical side rollers 459 and 458 or 348 are provided on the skates 140, 340, 150, 450; and a flexible connection 126/127 is provided between the drum support frame 122 and the AGV 102. Additionally, to enable exiting from a precision aligned state to a non-aligned state, a flat rail exit ramp 136, 236 is provided at the exit end of the flat rail 132, 232; a V-rail exit ramp 135, 235 is provided at the exit end of the V-rail 131, 231; gradually down-sloping flat upper surfaces 293, 292 are provided on the exit ramps 136, 236, 135, 235; and flat rear rollers 344c, 457 are provided on the skates 140, 340, 150, 450.

In a preferred embodiment of the tire building FMS system 100, the work stations 110 are aligned to and spaced along a common, linear working axis 111 so that the rail system 130, 230 can comprise a single pair of rails 131, 231, 132, 232; a single pair of entry ramps 133, 233, 134, 234; and a single pair of exit ramps 135, 235, 136, 236. Thus the inventive method, utilizing the preferred embodiment of equipment as described hereinabove, includes the following functionality. The tire building drum 120, moved by the AGV 102 rests atop the AGV 102 until the leading skates 140, 340, 150, 450 begin to enter the entry ramps 134, 234, 133, 233 before the first work station 110a. As the AGV 102 continues forward (following the path of the guide wire 104), the side rollers 459 and 458 or 348 interact with the funneling side ramps 237 and 238a or 238b to cause lateral movement of the tire building drum 120 as needed for lateral alignment of the leading V-skate 150, 450 with the V-rail 131, 231; and the flat front rollers 346, 456 roll up the gradually up-sloping flat upper surfaces 292, 293 to cause a raising of the leading end of the tire building drum 120 as needed to enable vertical alignment of the tire building drum 120 by supporting the tire building drum 120 on the precision aligned rail system 130, 230 instead of on the AGV 102. When the front rollers 346, 456 leave the entry ramps 134, 234, 133, 233, the front rollers 346, 456 will continue to bear weight, rolling on the flat upper surfaces 292, 293 of the rails 132, 232, 131, 231, until the bearing rollers 144, 344, 154, 454 contact the bearing surfaces 292, 291 and cause a further raising of the leading end of the tire building drum 120 so that the bearing rollers 144, 344, 154, 454 of the leading skates 140, 340, 150, 450 are riding on the rail system 130, 230. As the AGV 102 continues forward (following the path of the guide wire 104), the entry process is repeated for the trailing skates 140, 340, 150, 450 so that, once the trailing skates 140, 340, 150, 450 have passed through the entry ramps 134, 234, 133, 233 and the bearing rollers 144, 344, 154, 454 of the trailing skates 140, 340, 150, 450 are riding on the bearing surfaces 292, 291 of the rail system 130, 230, then the entire tire building drum 120 (and drum support frame 122) is raised off of the AGV 102 to ride on the precision aligned rail system 130, 230 with the axis of rotation 121 of the tire building drum 120 precision aligned vertically and horizontally with the working axis 111 of the automated tire building system 100 work stations 110. After the AGV 102 has moved the tire building drum 120 through all of the work stations 110, the leading skates 140, 340, 150, 450, followed by the trailing skates 140, 340, 150, 450, will exit the precision aligned rail system 130, 230 via the exit ramps 136, 236, 135, 235. As the last V-mounted bearing roller pair 454b enters the V-rail exit ramp 135, 235 it will roll down the gradually down-sloped bearing surface 291 of the V-rail exit ramp 135, 235 until the rear roller 457 begins to ride on the flat upper surface 293 of the V-rail 131, 231, after which the V-skate rear roller 457 and the flat skate rear-most roller 344c will together control the gradual lowering of the tire building drum 120 as they roll down the gradually down-sloped flat surfaces 293, 292 of the exit ramps 135, 235, 136, 236. After the trailing skates 140, 340, 150, 450 have exited the exit ramps, the drum support frame 122 (and the tire building drum 120) will be lowered to the point where it is resting entirely on the AGV 102.

Although the AGV 102 has been utilized in the described embodiment of the invention as a preferred way of moving the tire building drum 120 through the FMS 100, it should be understood that any means of propulsion could be utilized which allows the tire building drum 120, held by the drum support frame 122 to ride on skates 140, 340, 150, 450 and rails 132, 232, 131, 231 which provide precision alignment of the tire building drum 120 with the working axis 111 of a work station 110 of a tire building system 100 according to the invention as described herein. Therefore all such means of propulsion should be considered to be within the scope of the present invention.

Longitudinal Registration of Tire Building Drum to Work Station

As briefly described hereinabove in the exemplary sequence of operations for the automated tire building system 100, the intake server 114 (see FIG. 1A) extends laterally (in the direction of the arrow 107) to a position rearward of the tire building drum 120, couples to the tire building drum 120 while uncoupling the tire building drum 120 from the AGV 102, and moves the tire building drum 120 into a precision longitudinal position by abutting a drum reference point 125 (as shown in FIG. 1C) against the work station longitudinal reference point 115. The apparatus and methods for effecting this precision longitudinal positioning will now be described in detail.

The preferred embodiment of the present invention is able to accommodate longitudinal mis-positioning of the AGV 102 stopping point on the order of plus/minus 25 mm, while still longitudinally positioning the tire building drum 120 relative to the work station 110 with a repeatable accuracy of plus/minus 0.05 mm. An inventive AGV-drum flexible connection 560 provides the means for this, allowing the AGV 102 to be coupled to the tire building drum 120 in a way which enables the AGV 102 to push the tire building drum 120 even when the tire building drum 120 is raised, lowered, and shifted laterally (by the rail system 130, 230) relative to the AGV 102, and also allowing uncoupling so that the tire building drum 120 can be longitudinally moved relative to the AGV 102.

FIGS. 5A, 5B, 5C, and 5D, illustrate various views of the AGV-drum flexible connection 560, wherein FIGS. 5A and 5B show a side view and a perspective view, respectively, of the AGV-drum flexible connection 560 when it is "closed" (providing coupling between the AGV 102 and the drum support 122); and FIGS. 5C and 5D show a side view and a perspective view, respectively, of the AGV-drum flexible connection 560 when it is "open" (providing coupling between the drum support 122 and the work station 110, and not coupling the AGV 102 and the drum support 122). The AGV-drum flexible connection 560 comprises a coupling arm 526 (compare 126) connected through a suitable rotating bearing/shaft 568c and a drum support bracket 572 to the drum support 122 (not shown, see FIGS. 1C–1E, 6B and note that the drum support 122, 622 supports the tire building drum 120). The coupling arm 526 has a cam follower 566 at the distal end from the rotating bearing/shaft 568c, and is connected to a crank arm 527 (compare 127) in between. The cam follower 566 is supported by a suitable rotating bearing/shaft 568d. The crank arm 527 extends between the coupling arm 526 (connected by a suitable rotating bearing/shaft 568b), and the AGV bracket 570 (connected by a suitable rotating bearing/shaft 568a). The AGV bracket 570 is bolted to the top of the AGV 102 (not shown, but see 102 in FIGS. 1C, 1E, and 602 in FIG. 6B). All of the bearings/shafts 568 have horizontal axes which are parallel to each other and perpendicular to the longitudinal direction, i.e., to the drum axis of revolution 121. The coupling arm 526 and crank arm 527 move in parallel planes which planes extend in the vertical and longitudinal directions when the tire building drum 120 and AGV 102 are moving along the rail system 130, 230 through the work stations 110.

As best viewed in FIG. 5B, a height adjustment screw 562 with lock nut 563 is screwed through a right angle extension 561 of the coupling arm 526, and a stop arm 564 extends from the drum support bracket 572. The height adjustment screw 562 and stop arm 564 are positioned so that the height adjustment screw 562 can be used to adjust the height H of the cam follower 566 relative to the drum support frame 122 (as indicated by the drum support bracket 572 which is bolted to the drum support frame 122, 622, not shown) when the AGV-drum flexible connection 560 is closed. An optional sensor 574 (e.g., metal detecting proximity switch) and flag 576 can be mounted so as to indicate whether the AGV-drum flexible connection 560 is closed or at least partly open. An optional wedge cam 578 (best viewed in FIG. 5D) can be mounted on the coupling arm 526 such that a corresponding wedge cam follower (688 as seen in FIGS. 6B and 6C) suitably approaching from the side (into the page in the view of FIG. 5A) can force the coupling arm 526 down into a fully closed position and/or ride up the wedge cam 578 to orient the wedge cam follower 688 relative to the coupling arm 526.

The coupling arm 526 has a roughly triangular shape with bearings/shafts 568 at the vertexes: in particular, the crank-arm-to-coupling-arm bearing/shaft 568b is located at a vertex having an obtuse angle, and the cam follower bearing/shaft 568d is at a free end up above the other vertexes. Vertex angles and side lengths of the coupling arm 526, crank arm 527 length and mounting height, and drum support bracket 572 mounting height are adjusted according to the following criteria: When the AGV-drum flexible connection 560 is closed (FIG. 5A) and the drum support frame 122 is riding on the rail system 130, 230, the cam follower 566 is at a height H (determined by equipment needs to be described hereinbelow and fine tuned by adjusting the height adjustment screw 562); the drum support bracket 572 is a closed distance D1 from the AGV bracket 570; a crank arm angle is $\phi 1$; and a crank-arm-to-coupling-arm angle is $\phi 2$. The angles $\phi 1$, $\phi 2$ play a critical role in the operation of the AGV-drum flexible connection 560. The angle $\phi 1$ is the angle between the line connecting the bearings/shafts 568a, 568b of the crank arm 527 and the horizontal plane. The angle $\phi 2$ is the angle between the line connecting the bearings/shafts 568a, 568b of the crank arm 527 and the line connecting the bearings/shafts 568b, 568c of the coupling arm 526. The angles $\phi 1$, $\phi 2$ must each be at least a few degrees when the AGV-drum flexible connection 560 is closed in order to enable the AGV 102 to push the tire building drum 120 (via the AGV-drum flexible connection 560 and the drum support frame 122) along the rail system 130, 230. The AGV 102 moves longitudinally along the rail system 130, 230 in the direction indicated by a force arrow 594a. Since the AGV bracket 570 is attached to the AGV 102, the AGV 102 moving force 594a is exerted in the same direction 594a on the AGV-drum flexible connection 560. The moving force 594a is transmitted by the crank arm 527 which, because it is at the angle ($\phi 1$, creates a vertical downward force component 594b which is matched by a vertical upward reaction force 594d exerted by the stop arm 564 through the height adjustment screw 562, thereby preventing any vertical movement (buckling) of the AGV-drum flexible connection 560. The remaining horizontal force component 594c is transmitted by the coupling arm 526 to the drum support bracket 572 and thereby to the drum support frame 122 (and the tire building drum 120). Because of the angle $\phi 2$, vertical force components in the coupling arm 526 are also directed downward in the force component 594b, thereby maintaining the AGV-drum flexible connection 560 in a closed condition. It should be noted that the angle $\phi 1$ will decrease in magnitude as the drum support frame 122 is raised off of the AGV 102 by the rail system 130, 230, so it is important to assure that the angle $\phi 1$ is adequate when the drum support frame 122 is in the raised position for riding on the rail system 130, 230.

While closed, the AGV-drum flexible connection 560 accommodates raising/lowering of the drum support frame 122 relative to the AGV 102 by means of rotation about the AGV bracket bearing/shaft 568a (and corresponding counter-rotation about the drum support bracket bearing/shaft 568c). Lateral shifting of the drum support frame 122 relative to the AGV 102 is also accommodated by allowing space for lateral sliding of a crank arm hub 579a on the AGV bracket bearing/shaft 568a. As shown in FIG. 5B, the crank arm hub 579a has a width W1 which is less than an inside width W2 of the AGV bracket 570. The width difference (W2−W1) provides clearance which is sufficient to allow lateral sliding as needed to accommodate lateral variances between the path of the AGV 102 and the path of the drum support frame 122 riding on the rail system 130, 230. A similar treatment of the width of the drum support bracket 572 and of a coupling arm hub 579b could be used to add to, or replace, the clearance provided by the widths W1 and W2, but is not preferred because it would also allow changes in the lateral position of the cam follower 566 relative to the work station components which must couple with the cam follower 566. Thus, the AGV-drum flexible connection 560 is "flexible" in the sense of accommodating limited lateral and vertical movement of the drum support frame 122 relative to the AGV 102, but still maintains a connection that is rigid enough in the horizontal/longitudinal direction to allow the AGV 102 to push the drum support frame 122 along the rail system 130, 230.

FIGS. 5C and 5D show a side view and a perspective view, respectively, of the AGV-drum flexible connection 560 when it is open such that there is no longer a rigid connection between the AGV 102 and the drum support frame 122, i.e., the AGV 102 and the drum support 122 are uncoupled. The height adjustment screw 562 is no longer forced against the stop arm 564 to provide rigidity sufficient for pushing. The coupling arm 526 has been opened by raising the cam follower 566 end of the coupling arm 526, and thereby also raising the crank-arm-to-coupling-arm bearing/shaft 568b enough to cause the angles $\phi 1$ and $\phi 2$ to pass through zero degrees. Because of the leverage provided by the crank arm 527, further raising of the cam follower 566 will pull the drum support bracket 572 toward the AGV bracket 570 until the crank arm 527 approaches a vertical position. The drum support bracket 572 can be pulled even further toward the AGV bracket 570, rotating the crank arm 527 over the top of the AGV bracket 570, by longitudinally pulling the cam follower 566. The result of "opening" the AGV-drum flexible connection 560 as described is to decrease the distance between the drum support bracket 572 and the AGV bracket 570 from a closed distance D1 to an open distance D2, thereby longitudinally pulling the drum support frame 122 relative to the AGV 102, backwards relative to the direction of AGV movement 105, by an amount equal to the difference D2 minus D1. For example, the preferred embodiment is designed to pull for a maximum distance (D2−D1) of 160 mm. As will be discussed in more detail hereinbelow in the discussion of FIG. 6A, such a distance accommodates expected errors of up to plus/minus 25 mm in stopping point for the AGV 102, 602 and also allows clearance for the intake server 114, 614 to laterally move into position rearward of the stopped AGV 102, 602.

FIG. 6A illustrates a cutaway side view of a tire building drum 620 (compare 120) on a drum support frame 622 (compare 122) above an AGV 602 (compare 102) which has stopped in a work station 610 (compare 110) forward of an intake server 614 (compare 114) for that work station 610. As described hereinabove, the tire building drum 620 is riding on the rail system 630 (compare 130, 230) which has aligned the tire building drum's axis of revolution 621 (compare 121) with a working axis 611 (compare 111) of the work station 610. The intake server 614 is shown after it has laterally moved into position rearward of the tire building drum 620 such that a rotating head 618 of the intake server 614 is aligned with the working axis 611 (compare 111) of the work station 610. The intake server moves laterally on, for example, translation slide tracks 696 (696a, 696b) having precision control (e.g., by stepper motor control) over the stopping position of the intake server 614. The rotating head 618 is designed to mesh with corresponding portions of the tire building drum 620 so that the rotating head 618 can operate the tire building drum 620 (e.g., communicate with it, cause and control rotation of it) while it is in the work station 610. At the same time that the rotating head 618 and the tire building drum 620 are meshing, other air and/or electrical connectors can also mesh to transmit power and control signals between the tire building drum 620 and the work station 610. The rotating head 618 (and other connectors) and the tire building drum 620 can be meshed by longitudinally moving the tire building drum 620 back toward the intake server 614 when the intake server 614 and the tire building drum 620 are both aligned to the working axis 611. When the rotating head 618 and the tire building drum 620 are fully meshed, the vertical planar (e.g., flat annulus) rearward-facing surface of the tire building drum 620, which contains a drum reference point 625 (compare 125), will stop against a vertical planar (e.g., flat annulus) forward-facing surface of the intake server 614, which contains a work station longitudinal reference point 615 (compare 115); thereby providing precision longitudinal registration of the tire building drum 620 relative to the work station 610.

The intake server 614 has an intake actuator arm 680 powered by a cylinder 682 with cylinder rod 683. The intake actuator arm 680 has a box cam slot 684 which opens laterally outward, suitable for coupling with a cam follower 666 (compare 566) on a coupling arm 626 (compare 526) of the AGV-drum flexible connection 660 (compare 560). FIG. 6B offers an expanded-scale detail view of the coupling between the drum support frame 622 (and tire building drum 620) and the intake actuator arm 680 (and intake server 614). Also, FIG. 6C illustrates a side cross-sectional view, taken on the line 6C—6C in FIG. 6B. The cam follower 666 is fully inserted into the box cam slot 684 of the intake actuator arm 680. In order to accommodate slight variations in the vertical position of the cam follower 666, the box cam slot 684 has a width D2 which is greater than the cam follower diameter D1 by a small amount, e.g., 4 mm greater than the cam follower diameter D1 of 52 mm. Optionally, the box cam slot 684 can have a slightly chamfered lead-in edge as shown. Also optionally, a wedge cam follower 686 can be attached to the intake actuator arm 680 and suitably positioned to ride over the wedge cam 678 (compare 578) in order to force closed a slightly opened AGV-drum flexible connection 660, or to otherwise align slightly mis-positioned box cam and follower parts.

When the intake server 614 moves laterally outward (direction 107) to couple the intake actuator arm 680 with the AGV-drum flexible connection 660, the actuator arm 680 is in the down position as shown, with the box cam slot 684 extending horizontally in order to receive the cam follower 666 which can be mis-positioned longitudinally due to the imprecise stopping point of the AGV 602. By way of example, three possible stopping point positions of the cam follower 666 are shown by the dashed circles 696a, 696b, and 696c. Once the cam follower 666 is coupled with the box cam slot 684, the intake actuator arm 680 can be rotated clockwise (direction 697) by the cylinder 682, causing the cam follower 666 to follow a path such as the exemplary paths 695 (695a, 695b, 695c) which extend from corresponding initial positions 696 (696a, 696b, 696c) to corresponding final positions 696' (696a', 696b', 696c'). At first, the cam follower 666 will be mostly raised by the rotating box cam slot 684, and this will uncouple the drum support frame 622 from the AGV 602 as described hereinabove with reference to FIGS. 5A through 5D. The final part of the paths 695 show longitudinal movement of the cam follower 666, but as described hereinabove, due to the lever action of the crank arm 627 (compare 527) on the coupling arm 626 even more longitudinal movement of the tire building drum 620 will occur as a result. The motion of the cam follower 666 will halt at the final positions 696' (thereby also halting the rotating of the intake actuator arm 680 and the movement of the cylinder 682) when the rotating head 618 and the tire building drum 620 are fully meshed such that the drum reference point 625 is stopped against the work station longitudinal reference point 615, thereby providing precision longitudinal registration of the tire building drum 620 relative to the work station 610.

Continued pneumatic pressure in the cylinder 682 can be used to hold the tire building drum 620 in precise longitudinal registration for the operations of the work station 610. When those operations are completed, the cylinder 682 can be used to reverse the process, rotating the intake actuator arm 680 counterclockwise to the initial position of the box cam slot 684 (as determined, for example, by a stop on the cylinder), thereby forcing the cam follower forward and downward until it reaches its initial position 696 which also longitudinally moves the tire building drum 620 forward out of registration and no longer meshed with the intake server's rotating head 618. The AGV-drum flexible connection 560 is now re-coupled between the tire building drum 620 and the AGV 602. The intake server laterally retracts, uncoupling the cam follower 666 from the box cam slot 684 of the intake actuator arm, and the AGV 602 is free to push the tire building drum 620 forward out of the work station 610. Continued pneumatic pressure in the cylinder 682 can also be used to hold the intake actuator arm 680 in its initial position until after the intake actuator arm is coupled to the cam follower 666 of the next tire building drum 620.

It can be seen that the disclosed apparatus embodiment enables a method of longitudinal registration of a tire building drum 120, 620 relative to a work station 110, 610, the method comprising the steps of:

a) Registering the work station 610 to a work station longitudinal reference point 615 which is a fixed point upon a forward facing surface of the intake server 614 of the work station 610;

b) Registering the tire building drum 620 to a drum reference point 625 which is a fixed point upon a rearward-facing surface of the tire building drum 620; and c) Abler the tire building drum 620 has been moved into the work station 610, stopping the AGV 602, laterally extending the intake server 614 rearward of the tire building drum 620, and moving the tire building drum 620 to abut the drum reference point 625 against the work station longitudinal reference point 615.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for positioning each of three or more movable tire building drums at each of three or more work stations of an automated tire building system as the tire building drums move longitudinally forward along a working axis extending through the three or more work stations, the method comprising the steps of:

providing a work station longitudinal reference point at each of the three or more work stations;

providing a drum reference point upon each of the three or more movable tire building drums;

moving each of the tire building drums longitudinally forward into one of the three or more work stations;

stopping each of the tire building drums within its respective work station after the drum reference point moves longitudinally forward past the work station longitudinal reference point; and moving each tire building drum longitudinally rearward until the drum reference point abuts against the work station longitudinal reference point to precisely position each of the tire building drums longitudinally within its respective work station;

providing the work station longitudinal reference point of eash of the three or more work stations upon a surface of an intake server located at each of the three or more work stations for operating the tire building drums; and providing the drum reference point of each of the three or more movable tire building drums upon a surface of each of the three or more movable tire building drums; and further comprising the steps of:

moving the three or more intake servers at each of the work stations from a normally retracted position outward across the working axis into a position to couple the intake servers to the tire building drums located at the work stations; and using the intake servers for moving the tire building drums longitudinally rearward until the drum reference point abuts against the work station longitudinal reference point.

2. A method for positioning each of three or more movable tire building drums at each of three or more work stations of an automated tire building system as the tire building drums move longitudinally forward along a working axis extending through the three or more work stations, the method comprising the steps of:

providing a work station longitudinal reference point at each of the three or more work stations;

providing a drum reference point upon each of the three or more movable tire building drums;

moving each of the tire building drums longitudinally forward into one of the three or more work stations;

stopping each of the tire building drums within its respective work station after the drum reference point moves longitudinally forward past the work station longitudinal reference point; and moving each tire building drum longitudinally rearward until the drum reference point abuts against the work station longitudinal reference point to precisely position each of the tire building drums longitudinally within its respective work station;

independently moving each tire building drum with a self-propelled vehicle; and flexibly connecting each tire building drum to one of the vehicles with a coupling which can be uncoupled; and wherein each tire building drum is moved longitudinally rearward by the steps of:

coupling the work station to the tire building drum;

uncoupling the tire building drum from the vehicle; and longitudinally moving the tire building drum relative to the vehicle.

3. The method of claim 2, further comprising the step of:

using the rearward moving means to hold the drum reference point against the work station longitudinal reference point.

4. The method of claim 2, further comprising the step of;

coupling tire building drums to vehicles with a flexible connecting means which allows controlled lateral and vertical movement of the tire building drum relative to the vehicle while the vehicle is moving the tire building drum.

* * * * *